US008949336B2

(12) United States Patent
Kimura

(10) Patent No.: US 8,949,336 B2
(45) Date of Patent: Feb. 3, 2015

(54) NETWORK GAME SYSTEM AND PROGRAM

(75) Inventor: Masaaki Kimura, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 1122 days.

(21) Appl. No.: 12/270,188

(22) Filed: Nov. 13, 2008

(65) Prior Publication Data

US 2009/0137320 A1    May 28, 2009

(30) Foreign Application Priority Data

Nov. 16, 2007  (JP) ................................ 2007-298487

(51) Int. Cl.
*G06F 15/16* (2006.01)
*H04L 29/08* (2006.01)
*A63F 13/30* (2014.01)
*H04L 29/14* (2006.01)
*H04L 29/06* (2006.01)

(52) U.S. Cl.
CPC ............ *H04L 67/1093* (2013.01); *A63F 13/12* (2013.01); *H04L 69/40* (2013.01); *H04L 67/38* (2013.01); *H04L 67/1078* (2013.01); *H04L 67/1089* (2013.01); *A63F 2300/408* (2013.01); *A63F 2300/513* (2013.01)
USPC ........................................... 709/205; 463/42

(58) Field of Classification Search
USPC ............................................ 709/205; 463/42
See application file for complete search history.

(56) References Cited

U.S. PATENT DOCUMENTS 5,823,879 A * 10/1998 Goldberg et al. ............... 463/42
6,767,287 B1    7/2004 Mcquaid et al.
7,464,272 B2   12/2008 Danieli
7,496,943 B1 *  2/2009 Goldberg et al. ............... 725/22
2003/0114225 A1  6/2003 Kimura
2003/0114226 A1  6/2003 Kimura
2003/0216184 A1 11/2003 Kigoshi
2005/0071481 A1  3/2005 Danieli (Continued)

FOREIGN PATENT DOCUMENTS

EP             1519531        3/2005
JP         2003-325984 A     11/2003
WO    WO 2007058089 A1 *    5/2007

OTHER PUBLICATIONS

English language Abstract and partial translation of JP 2003-325984 A; Nov. 18, 2003.

(Continued)

*Primary Examiner* — Ryan Jakovac
(74) *Attorney, Agent, or Firm* — Greenblum & Bernstein, P.L.C.

(57) ABSTRACT

Disclosed is a network game system that allows a plurality of players to enter a network game without imposing a lot of load on a server apparatus for managing the entire progress of the network game. A game is played in different battle zones, and video game apparatuses which play the game in the same battle zone form each of video game apparatus groups. A server apparatus designates one of the video game apparatuses belonging to each of the video game apparatus groups as a front end server. The video game apparatus designated as the front end server controls decision of motions of non-player characters, calculation of change values of parameters of player characters, and transmission/reception of information regarding the progress of the game between the video game apparatuses belonging to each of the video game apparatus groups in a unified manner. Transmission of information regarding the progress state of the game in each battle zone to the server apparatus is performed in a unified manner. Designation of the front end server is changed for every predetermined time.

18 Claims, 11 Drawing Sheets

(56) References Cited

U.S. PATENT DOCUMENTS

2007/0149279 A1    6/2007  Norden et al.
2009/0270171 A1*  10/2009  Onuki et al. .................. 463/42

OTHER PUBLICATIONS

Extended European Search Report from European Patent Office (EPO) in European Patent Application No. 08253741.6, dated Nov. 22, 2012.

Rooney S et al., "A Federated Peer-to-Peer Network Game Architecture", IEEE Communications Magazine, IEEE Service Center, Piscataway, US, vol. 42, No. 5, XP001198093, May 1, 2004, pp. 114-122.

Shun-Yun Hu et al., "Von: A Scalable Peer-to-Peer Network for Virtual Environments", IEEE Network, IEEE Service Center, New York, NY, US, vol. 20, No. 4, XP001546796, Aug. 1, 2006, pp. 22-31.

* cited by examiner

FIG. 4A

| ID | PW | LOGIN DATE AND TIME | LOGOUT DATE AND TIME | IP ADDRESS | BATTLE ZONE | ENTER | BROWSE |
|---|---|---|---|---|---|---|---|
| ... | ... | ... | ... | ... | ... | ... | ... |
| 311 | 312 | 313 | 314 | 315 | 316 | 317 | 318 |

| GROUP A | ID | FRONT END | DESIGNATED DATE AND TIME | TEAM | GAME STATUS |
|---|---|---|---|---|---|
| FINAL RECEPTION | ... | ... | ... | ... | ... |
| 321 | 322 | 323 | 324 | 325 | 326 |

320A, 320B, 320X } 320

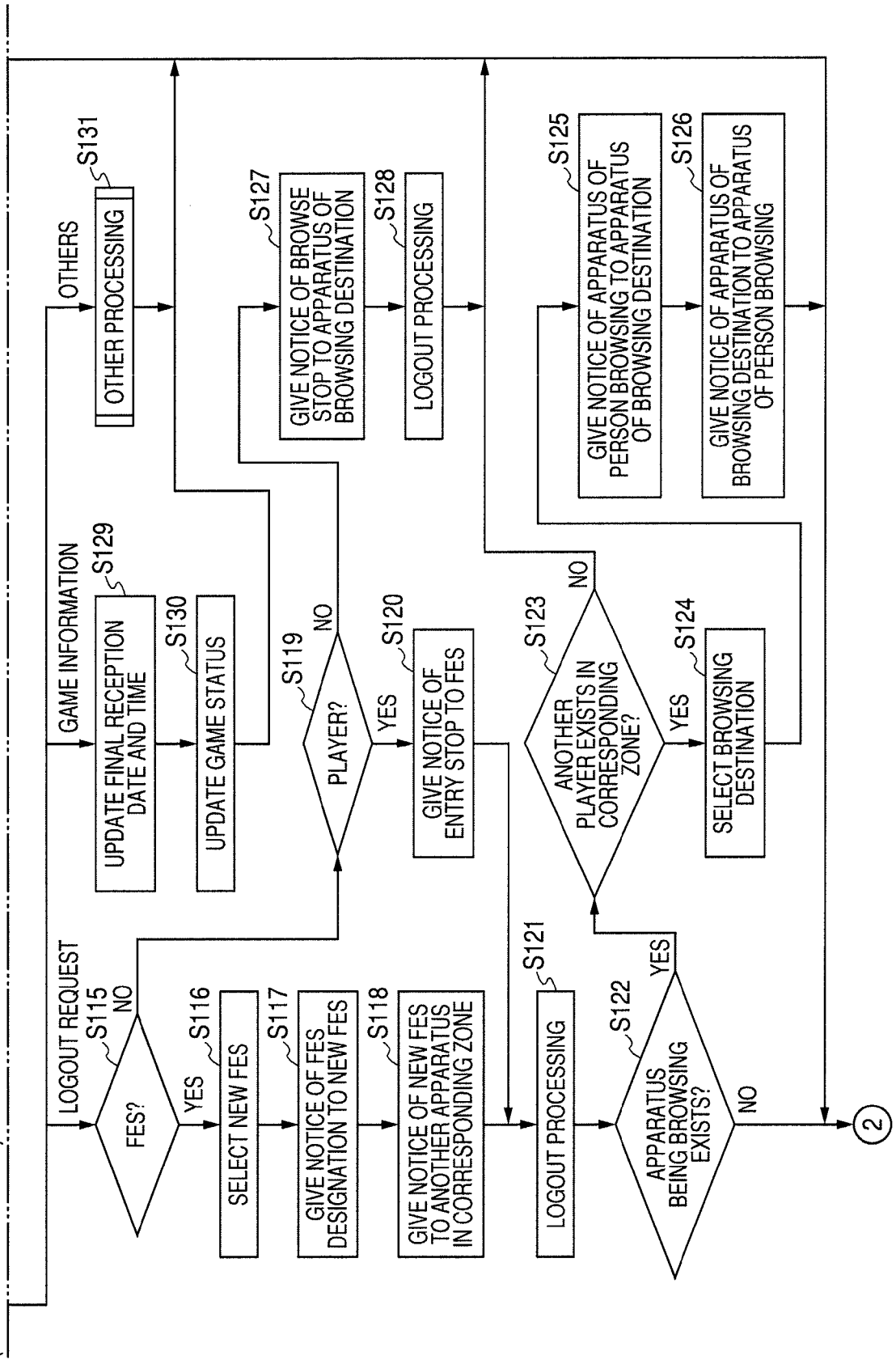

NETWORK GAME SYSTEM AND PROGRAM

CROSS REFERENCE TO RELATED APPLICATION

The present disclosure relates to subject matter contained in Japanese Patent Application No. 2007-298487, filed on Nov. 16, 2007, the disclosure of which is expressly incorporated herein by reference in its entirety.

BACKGROUND OF THE INVENTION

1. Field of the Invention

The present invention relates to a network game system in which a game is played among a plurality of players.

2. Description of the Related Art

The recent advancement of network technology promotes expansion of a network game (online game) which is played among a plurality of players. A system for a network game includes a server apparatus that is managed by an operator of a network game, and client apparatuses of individual players that are connectable to the server apparatus through a network, such as Internet.

In the network game, a player inputs an instruction with respect to a player character from an input device in a client apparatus, such as a video game apparatus, and accordingly plays the game. The network game does not allow only one player to play the game. That is, player characters of other players appear while the game is being played. Another network game is also known in which non-player characters, not player characters of players, appear while the game is being played. The non-player characters must take the same actions in the client apparatuses of the individual players.

The actions of player characters of a plurality of players or the actions of non-player characters must be noticed to the client apparatuses of the players so as to be consistent. For this reason, in the known network game, instructions regarding the actions of the player characters are collected into the server apparatus from all the client apparatuses, and the server apparatus collectively performs a processing necessary for the progress of the game, such as decision of the actions of the non-player characters. Information based on the processing result is distributed to the client apparatuses (for example, see JP-A-2003-325984 (Paragraphs 0059 and 0060)).

As in Patent Document 1, however, if the server apparatus must collectively perform the processing for the progress of the game, a lot of processing load is imposed on the server apparatus. In particular, in case of a game in which the actions of a plurality of player characters interact with each other on the progress of the game, as the number of player increases, the computation amount of processing of the server apparatus increases two or more times.

If the actions of the player characters affect the actions of the non-player characters or if the actions of the non-player characters affect the actions of the player character or other non-player characters, the computation amount significantly increases with respect to the number of characters. In order to solve this problem, the processing capability of the server apparatus may be increased, or the number of player characters or non-player characters may be limited. In the former case, an increase in cost may be caused, and in the latter case, an interest in the network game may be lost.

In general, an unspecified number of players enter the network game, and from among the players who play the network game, there may exist an unauthorized person who accesses the server apparatus and commits corruption. Presence of such an unauthorized person causes trouble to many other players. In order to allow many people to enjoy the game, it is necessary to quickly exclude a person who commits corruption. For the operator of the network game, management cost for exclusion of a person who commits corruption is no small matter.

SUMMARY OF THE INVENTION

It is an object of the invention to provide a network game system that allows a plurality of players to enter a network game, without imposing a lot of load on a server apparatus for managing the entire progress of the network game.

In order to achieve the above-described object, according to a first aspect of the invention, a network game system includes: a server apparatus; and a client group that has a plurality of client apparatuses, which are connectable to the server apparatus through a predetermined network and are connectable to each other through the predetermined network, but not through the server apparatus. The server apparatus includes a connection state management unit that manages the connection state of each of the plurality of client apparatuses, a game progress state management unit that manages the progress state of a game in each of the plurality of client apparatuses, an execution client designation unit that designates an optional client apparatus from among the plurality of client apparatuses belonging to the client group as an execution client for executing a predetermined processing from among processing for the progress of the game, and gives notice of information regarding designation of the execution client to the designated client apparatus through the predetermined network, a management client designation unit that designates an optional client apparatus from among the plurality of client apparatuses belonging to the client group as a management client for exchanging information regarding the progress of the game in the client group, and gives notice of information regarding designation of the management client to the designated client apparatus through the predetermined network, a game progress information receiving unit that receives the game progress information in the client group from the management client designated by the management client designation unit, and a game progress state update unit that, on the basis of the game progress information received by the game progress information receiving unit, updates the progress state of the game in each of the plurality of client apparatuses being managed by the game progress state management unit. Each of the plurality of client apparatuses includes an input unit that performs a predetermined input for the progress of the game in accordance with an operation of a player, a predetermined processing execution unit that, when a corresponding client apparatus is designated as the execution client by the execution client designation unit, executes the predetermined processing, a within-client-group transmitting/receiving unit that transmits and receives game input information based on an input from the input unit with respect to each of the client apparatuses belonging to the client group and game information within the client group based on game execution information regarding execution of the predetermined processing by the predetermined processing execution unit to and from other client apparatuses belonging to the client group through the predetermined network, and an outside-client-group transmitting unit that, when a corresponding client apparatus is designated as the management client by the management client designation unit, transmits the game progress information based on the game input information with respect to each of the client apparatuses belonging to the client group and the game execution information to the server apparatus through the predetermined network. The execution client designation unit changes a client apparatus to be designated as the execution client from among the plurality of client apparatuses belonging to the client group for every predetermined period.

The network game system includes a plurality of client apparatuses, and allows the players of the client apparatuses to operate the input unit and perform a predetermined input, thereby playing the game. The network game system also includes the server apparatus, and the server apparatus manages the connection state of each of the client apparatuses and the game progress state. Therefore, the server apparatus manages the entire game, which is played among a plurality of players, in a unified manner.

When the game is actually being played, an optional client apparatus from the client group having a plurality of client apparatuses is designated as an execution client by the server apparatus. A predetermined processing from among the processing for the progress of the game is performed in the client apparatus which is designated as the execution client. The game information within the client group including the game input information, the game execution information, and the like is transmitted and received between the client apparatuses belonging to the client group. For this reason, it is possible to implement a game which is played among the client apparatuses of the plurality of players, without imposing a lot of processing load on the server apparatus.

When the game is actually being played, an optional client apparatus from the client group having a plurality of client apparatuses is designated as a management client by the server apparatus. In order to manage the progress state of the game in the server apparatus in a unified manner, it is necessary to transmit the game progress information to the server apparatus, but the game progress information is collected into the management client and then transmitted to the server apparatus. For this reason, communication traffic can be reduced, and the processing load of the server apparatus can be reduced, as compared with a case where a plurality of client apparatuses individually transmit such information.

A client apparatus designated as an execution client from among a plurality of client apparatuses belonging to the client group is changed for every predetermined period. Therefore, even though an unauthorized person accesses an execution client at a certain point and commits corruption in the game, if a predetermined period elapses and a different client apparatus is designated as an execution client, the corruption becomes useless. As a result, corruption by an unauthorized person in the game can be suppressed.

Even though a client apparatus designated as an execution client leaves the game and a predetermined processing is not executed, if a predetermined period elapses and a different client apparatus is designated as an execution client, the predetermined processing is executed by the client apparatus newly designated as the execution client, thereby playing the game. Therefore, even though a client apparatus designated as an execution client leaves the game, there is no case where an obstacle occurs in the progress of the game for a long period. In addition, there is no case where a player of a client apparatus designated as an execution client forcibly continues to enter the game, and thus the player of the client apparatus can freely enter and leave the game.

The server apparatus may be formed of a single computer apparatus or a computer apparatus group having a plurality of computer apparatuses. The designation of the execution client by the execution client designation unit may be changed each time a predetermined period elapses. The predetermined period may be fixed or variable.

In the network game system according to the first aspect of the invention, the client apparatus designated as the execution client by the execution client designation unit and a client apparatus designated as the management client by the management client designation unit may be the same client apparatus.

In this case, the server apparatus does not need to separately designate the execution client and the management client from among a plurality of client apparatuses belonging to the client group. Therefore, the designation of the client apparatus is easily performed.

In the network game system according to the first aspect of the invention, the execution client designation unit may include a multiple designation unit that designates two or more client apparatuses from among the plurality of client apparatuses belonging to the client group as the execution client.

In this case, even if a processing load of a predetermined processing for the progress of the game is relatively large, the predetermined processing may be performed by two or more client apparatuses designated as an execution client in a distributed manner. Therefore, a processing load on one client apparatus is not significantly large.

In the network game system according to the first aspect of the invention, the server apparatus may further include a disconnection determination unit that determines whether or not communication with at least the client apparatus designated as the execution client from among the plurality of client apparatuses belonging to the client group is disconnected. In this case, if it is determined by the disconnection determination unit that communication with the client apparatus designated as the execution client is disconnected, the execution client designation unit may designate another client apparatus belonging to the client group as the execution client.

In this case, if it is determined that communication with a client apparatus designated as an execution client is disconnected, a new client apparatus is immediately designated as an execution client. Therefore, a blank period in which a predetermined processing for the progress of the game is not performed can be shortened, and thus there is no case where an obstacle occurs in the progress of the game.

In the network game system according to the first aspect of the invention, the network game system may further include an outside-group client apparatus that is connectable to an optional client apparatus belonging to the client group through the predetermined network, but not through the server apparatus. In this case, each of the plurality of client apparatuses may include an outside-client-group transmitting unit that transmits the game information within the client group to another client apparatus not belonging to the client group. The outside-group client apparatus may include a game-information-within-client-group receiving unit that receives the game information within the client group from the outside-client-group transmitting unit, and a game progress state output unit that, on the basis of the game information within the client group received by the game-information-within-client-group receiving unit, outputs information representing the progress state of the game in the client group.

In this case, when a person does not want to actively enter the game which is played among the players of the client apparatuses belonging to the client group and just wants to browse the game which is played among other players, his/her outside-group client apparatus of the person may be connected to an optional client apparatus belonging to the client group. A client apparatus not designated as an execution client or a management client from among a plurality of client apparatuses belonging to the client group has a relatively small processing load. For this reason, if the outside-group client apparatus is connected to such a client apparatus, a lot of people can be allowed to browse the game.

In order to achieve the above-described object, according to a second aspect of the invention, a program that causes a computer apparatus, which is connectable to each of client apparatuses belonging to a client group through a predetermined network, the client group having a plurality of client apparatuses being connectable to each other through the predetermined network, but not through the other computer apparatus, to function as: a connection state management unit that manages the connection state of each of the plurality of client apparatuses; a game progress state management unit that manages the progress state of a game in each of the plurality of client apparatuses; an execution client designation unit that designates an optional client apparatus from among the plurality of client apparatuses belonging to the client group as an execution client for executing a predetermined processing from among processing for the progress of the game, and gives notice of information regarding designation of the execution client to the designated client apparatus through the predetermined network; a management client designation unit that designates an optional client apparatus from among the plurality of client apparatuses belonging to the client group as a management client for exchanging information regarding the progress of the game in the client group, and gives notice of information regarding designation of the management client to the designated client apparatus through the predetermined network; a game progress information receiving unit that receives the game progress information in the client group from the management client designated by the management client designation unit; and a game progress state update unit that, on the basis of the game progress information received by the game progress information receiving unit, updates the progress state of the game in each of the plurality of client apparatuses being managed by the game progress state management unit. The execution client designation unit changes a client apparatus to be designated as the execution client from among the plurality of client apparatuses belonging to the client group for every predetermined period.

According to a third aspect of the invention, a program causes a computer apparatus, which is connectable to a server apparatus through a predetermined network and is connectable to other computer apparatuses belonging to the same computer apparatus group through the predetermined network, but not through the server apparatus, to function as: an input acceptance unit that accepts a predetermined input for the progress of a game input from an input unit by an operation of a player; a predetermined processing execution unit that, when the computer apparatus from among the computer apparatuses belonging to the computer apparatus group is designated as an execution computer apparatus for executing a predetermined processing from among processing for the progress of the game, executes the predetermined processing on the basis of a notice from the server apparatus; a within-group transmitting/receiving unit that transmits and receives game input information based on the input accepted by the input acceptance unit and game information within the group based on game execution information regarding execution of the predetermined processing by the predetermined processing execution unit to and from other computer apparatuses belonging to the computer apparatus group through the predetermined network; and an outside-group transmitting unit that, when the computer apparatus is designated as a management computer apparatus for exchanging information regarding the progress of the game in the computer apparatus group with the server apparatus, transmits the game input information with respect to each of the computer apparatuses belonging to the computer apparatus group and the game progress information based on the game execution information to the server apparatus through the predetermined network on the basis of a notice from the server apparatus.

The program according to the second or third aspect of the invention can be recorded on a computer-readable recording medium and provided. The computer-readable recording medium may be a recording medium that is removably mounted in the computer apparatus and provided separately from the computer apparatus. The computer-readable recording medium may be a recording medium, such as a fixed disk device, which is mounted in the computer apparatus and provided together with the computer apparatus. The program according to the second or third aspect of the invention may be distributed from the server apparatus on a network to the computer apparatus through the network while a data signal is superimposed on a carrier wave.

The server apparatus and the client apparatuses forming the network game system according to the first aspect of the invention may be individually stand-along. This still falls within the scope of the invention. A computer apparatus having the individual units to be implemented by the program according to the second or third aspect of the invention still falls within the scope of the invention. A method of executing processing to be executed by the units in the network game system according to the first aspect of the invention by steps, and a method of executing processing to be executed by the units in the program according to the second or third aspect of the invention by steps still fall within the scope of the invention.

BRIEF DESCRIPTION OF THE DRAWINGS

FIGS. 4A and 4B are diagrams a table group which is managed by a server apparatus shown in FIGS. 1 and 3;

DETAILED DESCRIPTION OF THE INVENTION

An embodiment of the invention will now be described with reference to the accompanying drawings.

Figure 1:
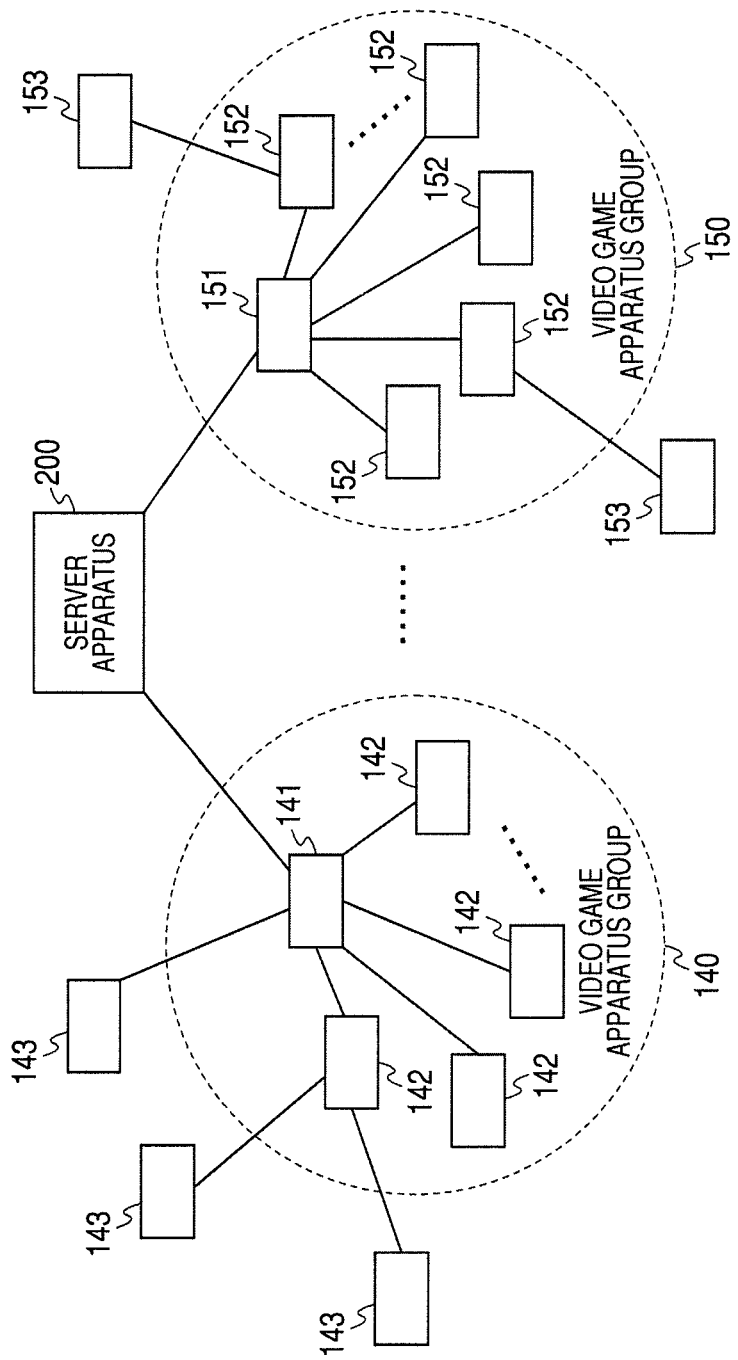
FIG. 1 is a block diagram showing the configuration of a network game system according to an embodiment of the invention.

FIG. 1 is a block diagram showing the configuration of a network game system according to this embodiment. As shown in FIG. 1, the network game system of this embodiment includes a plurality of video game apparatuses 100 (141 to 143, 151 to 153, . . . ) that are connected to a network (these are only physically connected, and those which are not logically connected are not shown), such as Internet, and a server apparatus 200. Two or more video game apparatuses 100 from among a plurality of video game apparatuses 100 form each of video game apparatus groups 140, 150, . . . includes.

The server apparatus 200 manages the entire progress of a network game of this embodiment. The server apparatus 200 manages the connection state of each of the video game apparatuses 100 and the state of a game which is being played in the video game apparatus 100. The video game apparatuses 100 are connectable to the server apparatus 200 through the network. The video game apparatuses 100 belonging to each of the video game apparatus groups 140, 150, . . . are connectable to each other through the network but not through the server apparatus 200, in a peer-to-peer manner.

The video game apparatuses 141, 151, . . . from among the two or more video game apparatuses 100 individually belonging to the video game apparatus groups 140, 150, . . . are designated as a front end server by the server apparatus 200 (a client with respect to the server apparatus 200). The video game apparatuses 141, 151, . . . as the front end server are changed for every predetermined period in accordance with designation by the server apparatus 200. The video game apparatuses 141, 151, . . . function as the front end server, and the server apparatus 200 functions as a back end server. Other video game apparatuses 142, 152, . . . function as a client with respect to the video game apparatuses 141, 151, . . . as the front end server.

The network game of this embodiment is a game in which the players of the video game apparatuses 100 are divided into a team A and a team B, and play a match among the teams. A plurality of battle zones are set on a map of the game, the player of each video game apparatus 100 decides a team, to which his/her own player character belongs, and a battle zone, and enters the game. The video game apparatus groups 140, 150, . . . are provided to correspond to the battle zones. The video game apparatuses 100 belonging to the same type as the video game apparatus group 140, 150, . . . progress the game in a corresponding battle zone while exchanging information in a peer-to-peer manner through the network, but not though the server apparatus 200.

The video game apparatuses 141, 151, . . . as the front end server are only configured to be connected to the server apparatus 200 through the network, and to transmit information regarding the progress state of a battle to the server apparatus 200 as occasion demands. If the server apparatus 200 has information necessary for controlling the progress of the game, the video game apparatuses 141, 151, . . . as the front end server are only configured to receive information from the server apparatus 200.

The player of each video game apparatus 100 sequentially designates the position of the player character on the map in the selected battle zone, and if the player character meets a character of an opponent team while approaching the designated position, a battle automatically starts. An AI routine for deciding a battle action against the character of the opponent team which the player character meets is included in a game program executed in the video game apparatus 100. The AI routine is executed in the video game apparatus 100 of the player corresponding to the player character that meets the character of the opponent team.

In the network game of this embodiment, with respect to the video game apparatus groups 140, 150, . . . , non-player characters appear in addition to the player character which moves in accordance with an operation of each player. The non-player characters automatically move by execution of an AI routine, not depending on the operation of the player. A game program which is executed by each of the video game apparatuses 100 includes the AI routine. The video game apparatuses 100 which execute the AI routine for moving the non-player characters are only the video game apparatuses 141, 151, . . . as the front end server.

The video game apparatuses 141, 151, . . . as the front end server individually collect the positions or battle actions of the player characters from other video game apparatuses 142, 152, . . . belonging to the same type as the video game apparatus groups 140, 150, . . . , and calculate change values of parameters of each player character on the basis of the positions or battle actions of the player characters and the motions of the non-player characters. The change values of the parameters of each player characters or information regarding the motions of the non-player characters is exchanged between the video game apparatuses 100 belonging to the same type as the video game apparatus groups 140, 150, . . . in a peer-to-peer manner not through the server apparatus 200.

In the network game of this embodiment, a person may not enter the game and browse the game, which is played among other players, in each battle zone. The video game apparatuses 143, 153, . . . that just want to browse the game, which is played among other players, are appropriately connected to optional video game apparatuses 141, 142, 151, 152, . . . belonging to the video game apparatus groups 140, 150, . . . corresponding to the battle zones desired to browse in a peer-to-peer manner not through the server apparatus 200, and receive information regarding the progress state of the game.

In the network game system of FIG. 1, the server apparatus 200 controls peer-to-peer connection between the video game apparatuses 100. That is, in order for a video game apparatus 100 to enter the game or browse the game, first, the video game apparatus 100 has to access the server apparatus 200 and to acquire necessary information for exchanging information with other video game apparatuses 100 in a peer-to-peer manner. When a new video game apparatus 100 enters the game or browses the game, necessary information is noticed to a video game apparatus 100 which is playing the game and exchanges information with the new video game apparatus 100.

Figure 2:
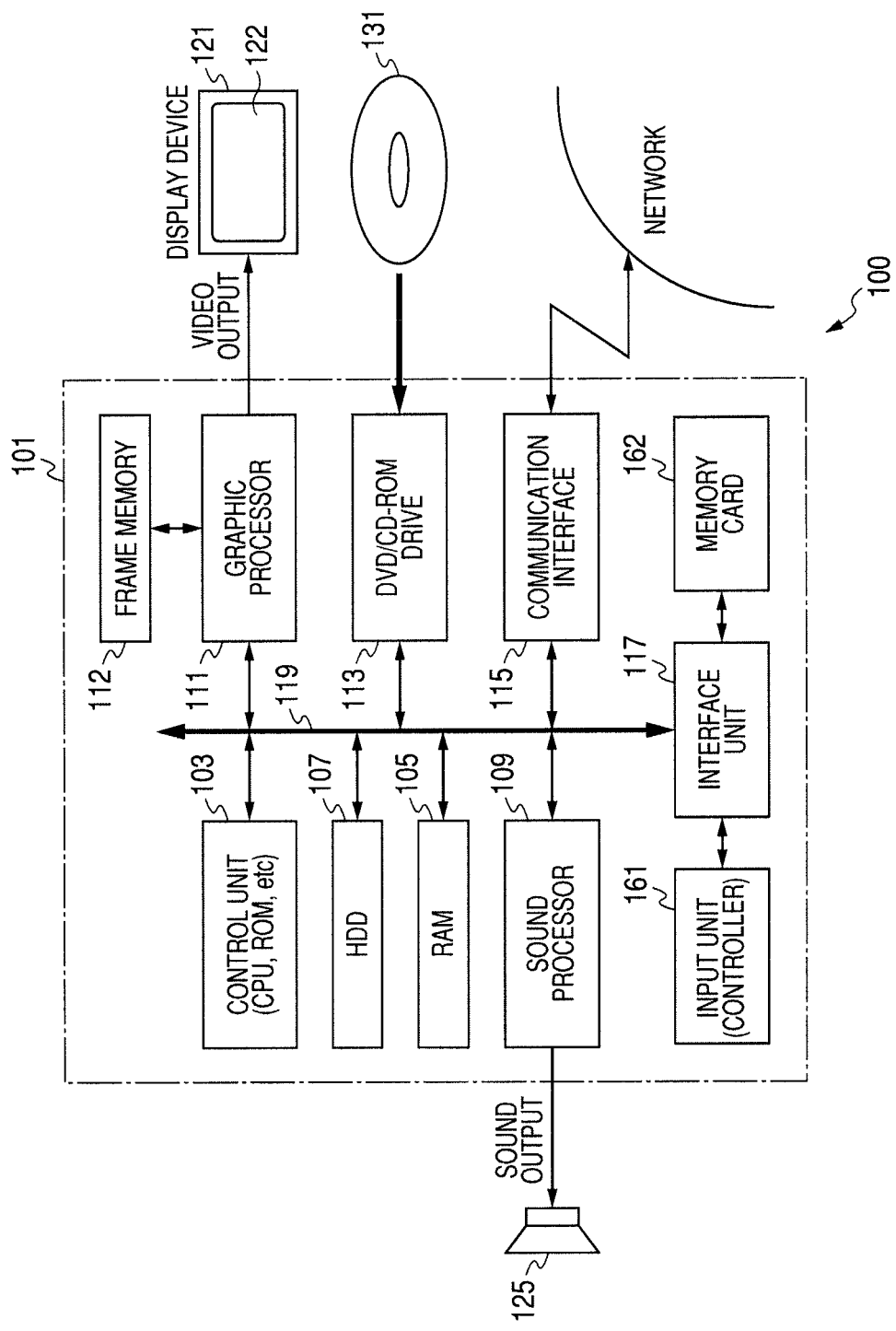
FIG. 2 is a block diagram showing the configuration of a video game apparatus shown in FIG. 1.

Next, the configuration of the video game apparatus 100 and the server apparatus 200 will be described. FIG. 2 is a block diagram showing the configuration of the video game apparatus 100 shown in FIG. 1. As shown in FIG. 2, the video game apparatus 100 is constructed focusing on an apparatus main body 101. The apparatus main body 101 includes a control unit 103, a RAM (Random Access Memory) 105, a hard disk drive (HDD) 107, a sound processor 109, a graphic processor 111, a DVD/CD-ROM drive 113, a communication interface 115, and an interface unit 117, all of which are connected to an internal bus 119.

The sound processor 109 of the apparatus main body 101 is connected to a sound output device 125 including a speaker, and the graphic processor 111 is connected to a display device 121 having a display screen 122. A recording medium (in this embodiment, a DVD-ROM or a CD-ROM) 131 may be mounted in the DVD/CD-ROM drive 113. The communication interface 115 is connected to a network. An input unit (controller) 161 and a memory card 162 are connected to the interface unit 117.

The control unit 103 includes a CPU (Central Processing Unit), a ROM (Read Only Memory), and the like, and executes a program stored in the HDD 107 or on the recording medium 131 to control the apparatus main body 101. The control unit 103 includes an internal timer. The RAM 105 is used as a work area of the control unit 103. The HDD 107 is a storage area for storing programs or data. When a program being executed by the control unit 103 instructs to output sound, the sound processor 109 analyzes the instruction and outputs sound signals to the sound output device 125.

The graphic processor 111 develops image data to a frame buffer (frame memory) 112 (in FIG. 2, though shown outside the graphic processor 111, the frame memory is provided in a RAM of a chip forming the graphic processor 111) in accordance with a drawing instruction output from the control unit 103, and outputs video signals such that images are displayed on the display screen 122 of the display device 121. One frame time of images in the video signals output from the graphic processor 111 is, for example, 1/60 seconds.

The DVD/CD-ROM drive 113 reads out the programs or data from the recording medium 131. The communication interface 115 is connected to the network and performs communication with other computers. The input unit 161 includes a cross key and a plurality of operating buttons. The directional key is used to select a desired option (the battle zone or the like) from input options, or select the movement position of the player character. The operating buttons include a button for deciding the selection by the directional key.

The interface unit 117 outputs input data from the input unit 161 to the RAM 105, and the control unit 103 analyzes input data and executes an arithmetic operation. The interface unit 117 also stores data representing the progress state of the game stored in the RAM 105 in the memory card 162, and reads out data on the game stored in the memory card 162 at the time of suspending the game and transmits data to the RAM 105 on the basis of an instruction from the control unit 103.

The programs and data for performing the game with the video game apparatus 100 are initially stored in the recording medium 131. Data stored in the recording medium 131 includes graphic data constituting an object in a game space (virtual three-dimensional space). The programs and data stored in the recording medium 131 are read out by the DVD/CD-ROM drive 113 at the time of execution and are loaded onto the RAM 105. The control unit 103 processes the programs and data loaded onto the RAM 105, outputs the drawing instruction to the graphic processor 111, and outputs an instruction to output sound to the sound processor 109. While the control unit 103 performs the processing, intermediate data is stored in the RAM 105.

Figure 3:
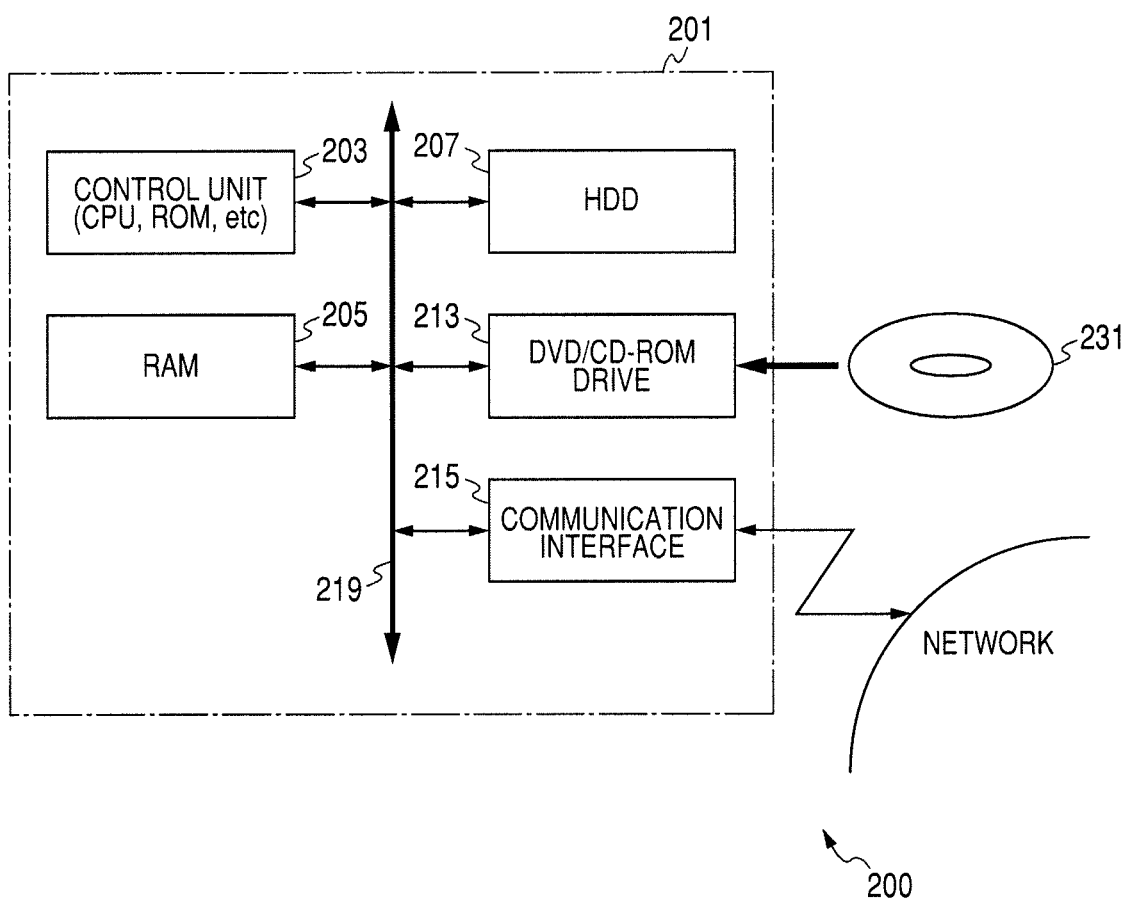
FIG. 3 is a block diagram showing the configuration of a server apparatus shown in FIG. 1.

FIG. 3 is a block diagram showing the configuration of the server apparatus 200 shown in FIG. 1. As shown in FIG. 3, the server apparatus 200 is constructed focusing on a server main body 201. The server main body 201 includes a control unit 203, a RAM 205, a hard disk drive (HDD) 207, a DVD/CD-ROM drive 213, and a communication interface 215, all of which are connected to an internal bus 219. A recording medium (DVD-ROM or CD-ROM) 231 is mounted in the DVD/CD-ROM drive 213.

The control unit 203 includes a CPU (Central Processing Unit), a ROM (Read Only Memory), and the like, and executes a program stored in the HDD 207 or on the recording medium 231 to control the server apparatus 200. The control unit 203 includes an internal timer that measures a current time. The RAM 205 is used as a work area of the control unit 203. The HDD 207 is a storage area for storing programs or data. The communication interface 215 is connected to the network and performs communication with the video game apparatuses 100.

In the server apparatus 200, the programs and data for performing the network game are initially stored in the recording medium 231, and installed in the HDD 207 from the recording medium 231. The programs and data are read out from the HDD 207 at the time of execution and are loaded onto the RAM 205. The control unit 203 processes the programs and data loaded onto the RAM 205, and progresses the network game based on messages from the video game apparatuses 100. While the control unit 203 performs the processing, intermediate data is stored in the RAM 205.

Next, data which is managed by the server apparatus 200 for the progress of the network game of this embodiment will be described. FIGS. 4A and 4B show a table group which is managed by the server apparatus 200 for execution of the network game according to this embodiment. From the table group, FIG. 4A is a connection state table for managing connection information of the video game apparatuses 100, which can use a service of the network game. FIG. 4B is a game progress table for managing the progress of the network game.

In the connection state table 310 of FIG. 4A, ID 311, password 312, login date and time 313, logout date and time 314, IP address 315, battle zone classification 316, enter flag 317, and browsing destination information 318 are registered with respect to the video game apparatuses 100, which can use the service of the network game, regardless of whether or not they currently use the service of the network game.

The ID 311 is identification information for uniquely identifying the (player of) video game apparatus 100. The password 312 is used for authentication when the (player of) video game apparatus 100 uses the service of the network game. The login date and time 313 represents date and time at which the (player of) video game apparatus 100 logs in to the server apparatus 200 in order to use the service of the network game. When logging in, the player of the video game apparatus 100 designates the enter/browse classification and a battle zone desired to enter/browse. When the player wants to enter the game, a team to which the player belongs is also designated.

The logout date and time 314 represents date and time at which the (player of) video game apparatus 100 log outs. If the video game apparatus 100 is one of the video game apparatuses 141, 151, . . . designated as the front end servers, and information is not received for a predetermined period, a data link between the video game apparatus 100 and the server apparatus 200 is regarded as being unsettable, and logout is forcibly performed. When the video game apparatus 100 is one of the video game apparatuses 143, 153, . . . that just browse the game which is played among other people, normal logout may not be performed, and browsing may be stopped. In this case, only the login date and time 313 is registered, and the logout date and time 314 is not registered. However, there is no problem for practical use.

The IP address 315 is an IP address of the video game apparatus 100 on the network, and is needed as an address for transmission/reception of information between the server apparatus 200 and the video game apparatus 100 and between the video game apparatuses 100. The battle zone classification 316 represents the classification of a battle zone in which the video game apparatus 100 is playing the game or browsing the game. When the video game apparatus 100 is playing the game, the battle zone classification 316 corresponds to the video game apparatus group 140, 150, . . . .

The enter flag 317 is a flag that is set when the (player of) video game apparatus 100 is not one of the video game apparatuses 143, 153, . . . that are just browsing the game being played among other people, but one of the video game apparatuses 141, 142, 151, 152, . . . that are playing the game and form the video game apparatus groups 140, 150, . . . . When the video game apparatus 100 is one of the video game apparatuses 143, 153, . . . that are just browsing the game being played among other people, the browsing destination information 318 represents to which of the video game apparatuses 141, 142, 151, 152, . . . the video game apparatus 100 is connected in order to browse the game, which is played among other people.

The game progress table 320 shown in FIG. 4B includes tables 320A, 320B, . . . , and 320X with respect to the video game apparatus groups 140, 150, . . . (battle zones). The video game apparatuses 100 with information described below registered in the tables 320A, 320B, . . . , and 320X include only the video game apparatuses 141, 142, 151, 152, . . . that are playing the game, excluding the video game apparatuses 143, 153, . . . that are just browsing the game being played among other people.

In the game progress tables 320 of the video game apparatus groups 140, 150, . . . , date and time at which each of the video game apparatuses 141, 151, . . . in the video game apparatus groups 140, 150, . . . is designated as the front end server, and date and time 321 at which information is finally received after designation are registered. In the game progress tables 320 of the video game apparatus groups 140, 150, . . . , with respect to each video game apparatus 100 that enters a corresponding battle zone, ID 322, front end flag 323, front end designated date and time 324, team 325, and game status 326 are registered.

The ID 322 is identification information for uniquely identifying the (player) of the video game apparatus 100. The front end flag 323 is a flag that is set when the video game apparatus 100 is currently designated as one of the video game apparatuses 141, 151, . . . which become the front end server. The front end designated date and time 324 represents date and time at which the video game apparatus 100 is designated as one of the video game apparatuses 141, 151, . . . which become the front end servers.

The team 325 represents a team to which the (player of) video game apparatus 100 belongs on the game. The game status 326 represents information regarding the progress state of the game by the (player of) video game apparatus 100, and includes information regarding the position of the player character on the map or the values of various parameters.

The ID 322 and the team 325 are consistently maintained between login and logout of the video game apparatus 100, and the front end flag 323 and the designated date and time 324 are updated by a processing of the server apparatus 200 as occasion demands. The game status 326 is occasionally updated in accordance with information regarding the game progress state transmitted from the video game apparatuses 141, 151, . . . as the front end server.

Next, the progress of the network game according to this embodiment will be schematically described. FIGS. 5A to 5D and FIGS. 6A to 6E are diagrams schematically showing the progress of the network game according to this embodiment. In the drawings, it is assumed that all the video game apparatuses 100 belong to the video game apparatus group 140 or browse the game, which is played among other people, in the video game apparatus group 140.

Figure 5A:
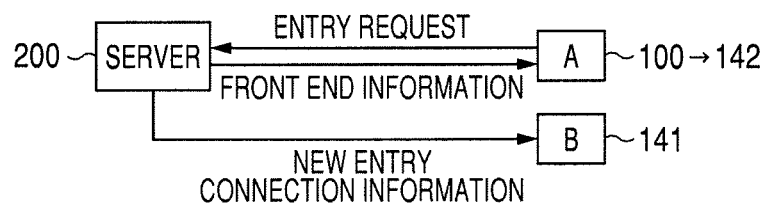
FIGS. 5A to 5D are diagrams schematically showing the progress of a network game according to an embodiment of the invention.

As shown in FIG. 5A, when a video game apparatus 100 (A) which has not entered the game wants to newly enter the game, a player designates "enter" in the enter/browse classification, designates a battle zone and a team entering the game, and inputs an ID and a password. Then, the video game apparatus 100(A) requests the server apparatus 200 for the login. The server apparatus 200 compares the ID and the password transmitted when login is requested with the ID 311 and the password 312 registered in the connection state table 310, and performs authentication.

If login is accepted based on the authentication result, the server apparatus 200 sets the enter flag 317 registered in the connection state table 310 with respect to the video game apparatus 100(A), creates a new record in the game progress table 320 of the designated battle zone, and registers the ID 322, the team 325, and the game status 326 of the video game apparatus 100(A).

In addition, the ID 311 and the IP address 315 of the video game apparatus 100(A) are noticed to a video game apparatus 141(B) with the front end flag 323 in the game progress table 320 of the corresponding battle zone set. Simultaneously, the ID 311 and the IP address 315 of the video game apparatus 141(B) with the front end flag 323 set are noticed to the video game apparatus 100(A). Accordingly, the video game apparatus 100(A) becomes a video game apparatus 142(A) that belongs to the video game apparatus group 140 and can enter the game in the designated battle zone. Information can be transmitted and received between the video game apparatus 141(B) and the video game apparatus 142(A) not through the server apparatus 200.

Figure 5B:
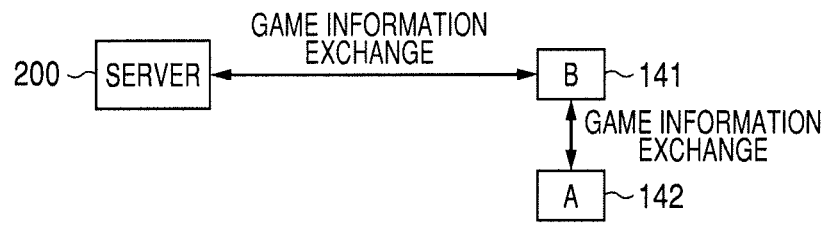

Thereafter, as shown in FIG. 5B, the video game apparatus 141(B) and the video game apparatus 142(A) belonging to the video game apparatus group 140 play the game while transmitting and receiving information regarding the game through the network, but not through the server apparatus 200, in a peer-to-peer manner. Specifically, information regarding a movement position of a player character based on a position input from the input unit 161 by the player of the video game apparatus 142(A) and information regarding a battle action of the player character based on execution of the AI routine are collected into the video game apparatus 141(B) designated as the front end server.

The video game apparatus 141(B) designated as the front end server further executes the AI routine to decide the motions of the non-player characters, and calculates the change values of the parameters of each player characters based on the motions of the player characters and the non-player characters. Next, the video game apparatus 141(B) transmits information regarding the motions (positions and battle actions) of each player characters in the corresponding battle zone or information regarding the change values of the parameters to the video game apparatus 142(A).

The video game apparatus 142(A) generates an image of the game on the basis of information transmitted from the video game apparatus 141(B) designated as the front end server and displays the image as the display screen 122. Meanwhile, the video game apparatus 141(B) designated as the front end server generates an image of the game on the basis of information transmitted from the video game apparatus 142 belonging to the same video game apparatus group 140 or information, which is calculated therein, and displays the image as the display screen 122.

Only the video game apparatus 141(B) designated as the front end server from the video game apparatus group 140 transmits and receives information necessary for the progress of the game through the network. Specifically, the video game apparatus 141(B) designated as the front end server transmits information regarding the game status, including the positions of the player characters in the corresponding battle zone or the change values of the parameters to the server apparatus 200. The server apparatus 200 updates the game status 326 registered in the game progress table 320 on the basis of information regarding the game status received from the video game apparatus 141(B) designated as the front end server.

For example, when the progress state of the game in other video game apparatus groups 150, . . . affects the progress of the game in the video game apparatus group 140, the server apparatus 200 transmits information necessary for controlling the progress of the game to the video game apparatus 141(B) designated as the front end server. When this information is transmitted, the video game apparatus 141(B) transmits the information to the video game apparatus 142(A) or calculates the motions of the non-player characters or the change values of the parameters of the player characters on the basis of the information.

Figure 5C:
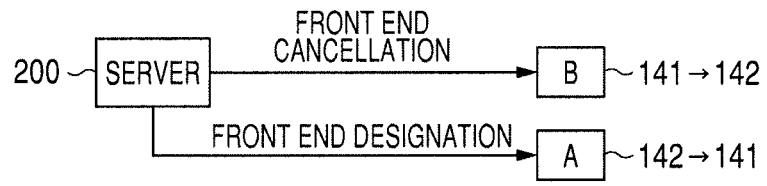

As shown in FIG. 5C, the server apparatus 200 monitors whether or not a predetermined time elapses from the designated date and time 324 registered in the game progress table 320 with respect to the video game apparatus 141(B), which is currently designated as the front end server. If it is determined that the predetermined time elapses, a different video game apparatus 142 belonging to the same video game apparatus group 140 is newly designates as the front end server.

Specifically, the server apparatus 200 selects one of the video game apparatuses 142 registered in the game progress table 320 with the front end flag 323 not set, by a predetermined method (here, it is assumed that the video game apparatus 142(A) is selected).

The server apparatus 200 resets the front end flag 323 registered in the game progress table 320 with respect to the video game apparatus 141(B), which is designated as the front end server hitherto, and erases the designated date and time 324. In addition, the server apparatus 200 transmits an instruction to cancel the designation of the front end server to the video game apparatus 141(B) through the network. When receiving the instruction, the video game apparatus 141(B), which was the front end server, is no longer the front end server, and becomes the video game apparatus 142(B), which is not the front end server, in the video game apparatus group 140.

The server apparatus 200 sets the front end flag 323 registered in the game progress table 320 with respect to the newly selected video game apparatus 142(A), and registers current date and time measured by the internal timer of the control unit 203 as the designated date and time 324. In addition, the server apparatus 200 transmits an instruction to designate as the front end server to the video game apparatus 142(A) with reference to the IP address 315 registered in the connection state table 310. This instruction includes the ID 311 and the IP address 315 of all the video game apparatuses belonging to the video game apparatus group 140. When receiving this instruction, the video game apparatus 142(A) becomes the video game apparatus 141(A) which newly serves as the front end server.

Figure 5D:
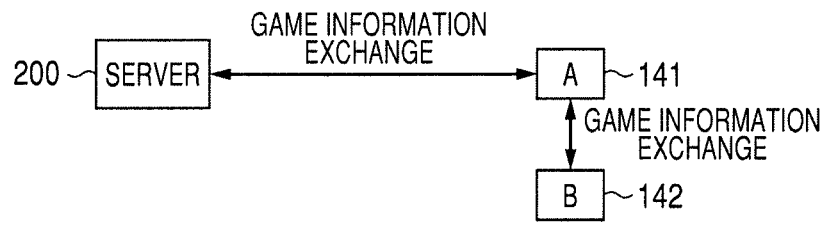

Thereafter, as shown in FIG. 5D, the video game apparatus 141(A) and the video game apparatus 142(B) belonging to the video game apparatus group 140 play the game while transmitting and receiving information regarding the game through the network, but not through the server apparatus 200, in a peer-to-peer manner. Only the video game apparatus 141(A) designated as the front end server from the video game apparatus group 140 transmits and receives information necessary for the progress of the game through the network. This processing is the same as described with reference to FIG. 5B, except that the front end server is replaced.

Figure 6A:
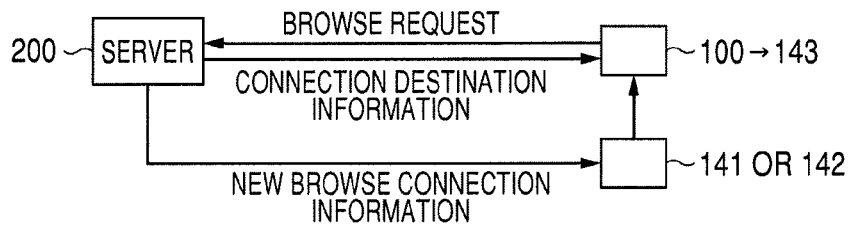
FIGS. 6A to 6E are diagrams schematically showing the progress of a network game according to an embodiment of the invention.

As shown in FIG. 6A, when a video game apparatus 100 which has not browsed the game, wants to newly browse the game, a player designates "browse" in the enter/browse classification, designates a battle zone desired to browse the game, and inputs the ID and the password. Then, the video game apparatus 100 requests the server apparatus 200 for the login. The server apparatus 200 compares the ID and the password transmitted when login is requested with the ID 311 and the password 312 registered in the connection state table 310, and performs authentication.

If login is accepted based on the authentication result the server apparatus 200 selects one of the video game apparatuses 141 and 142 in the game progress table 320 of the battle zone, and registers information (ID or the like) for specifying the selected video game apparatus 141 or 142 in the browsing destination information 318 of the connection state table 310 with respect to the corresponding video game apparatus 100.

Next, the ID 311 and the IP address 315 of the corresponding video game apparatus 100 are noticed to the selected video game apparatus 141 or 142 from the game progress table 320 of the corresponding battle zone. Simultaneously, the ID 311 and the IP address 315 of the selected video game apparatus 141 or 142 are noticed to the video game apparatus 100. Accordingly, the video game apparatus 100 becomes the video game apparatus 143 that can browse the game of the designated battle zone. The video game apparatus 143 can receive information regarding the progress state of the game in the corresponding battle zone from the selected video game apparatus 141 or 142 not through the server apparatus 200. The video game apparatus 143 generates an image of the game on the basis of information transmitted from the video game apparatus 141 or 142, and displays the image as the display screen 122.

Figure 6B:
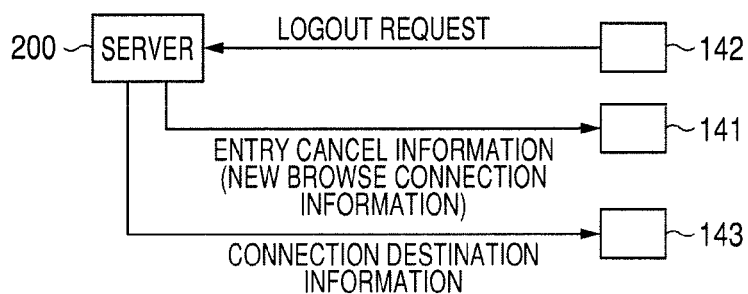

As shown in FIG. 6B, if a logout request is received from the video game apparatus 142 that is not the front end server but is playing the game, the server apparatus 200 performs a predetermined logout processing, and deletes a record regarding the video game apparatus 142, which requests the logout, from the game progress table 320. Simultaneously, the server apparatus 200 gives notice of the ID 311 of the video game apparatus 142 to the video game apparatus 141 designated as the front end server. The video game apparatus 141 designated as the front end server stops information exchange with the noticed video game apparatus 142.

If there is the video game apparatus 143 with the video game apparatus 142, which requests the logout, set in the browsing destination information 318, the server apparatus 200 selects one of the video game apparatuses 141 and 142 registered in the game progress table 320 with respect to the same video game apparatus group 140. The server apparatus 200 also registers information (ID or the like) for specifying the selected video game apparatus 141 or 142 in the browsing destination information 318 of the connection state table 310 with respect to the corresponding video game apparatus 100.

Next, the ID 311 and the IP address 315 of the video game apparatus 143 are noticed to the selected video game apparatus 141 or 142 from the game progress table 320 of the corresponding battle zone, and the ID 311 and the IP address 315 of the selected video game apparatus 141 or 142 are noticed to the corresponding video game apparatus 100. Accordingly, the video game apparatus 143 that is connected to the currently logged-out video game apparatus 142 to browse the game becomes the video game apparatus 143 that can be connected to the newly selected video game apparatus 141 or 142 to browse the game of the designated battle zone.

Figure 6C:
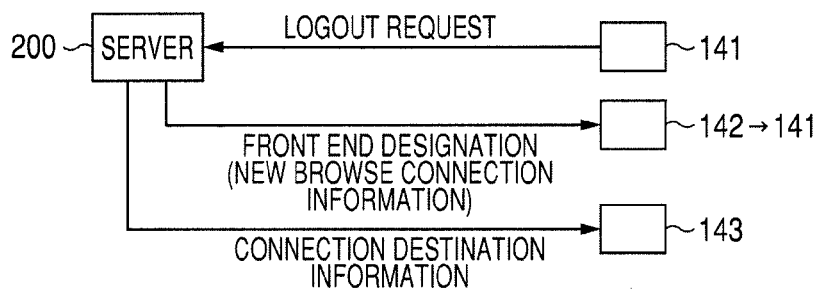

As shown in FIG. 6C, if a logout request is received from the video game apparatus 141 that is currently designated as the front end server, the server apparatus 200 executes a predetermined logout processing, and deletes a record regarding the video game apparatus 141, which requests the logout, from the game progress table 320. Then, one of other video game apparatuses 142 belonging to the same video game apparatus group 140 is selected as a new front end server.

With respect to the video game apparatus 142, the server apparatus 200 transmits an instruction to designate as the front end server to the video game apparatus 142 with reference to the IP address 315 registered in the connection state table 310. This instruction includes the ID 311 and the IP address 315 of all the video game apparatus (excluding the video game apparatus which requests the logout) in the video game apparatus group 140. The video game apparatus 142 that receives this instruction becomes the video game apparatus 141 newly designated as the new front end server.

If there is the video game apparatus 143 with the video game apparatus 141, which requests the logout, set in the browsing destination information 318, the server apparatus 200 selects one of the video game apparatuses 141 and 142 registered in the game progress table 320 with respect to the same video game apparatus group 140. The server apparatus 200 also registers information (ID or the like) for specifying the selected video game apparatus 142 in the browsing destination information 318 of the connection state table 310 with respect to the corresponding video game apparatus 100.

Next, the ID 311 and the IP address 315 of the video game apparatus 143 are noticed to the selected video game apparatus 141 or 142 from the game progress table 320 of the corresponding battle zone, and the ID 311 and the IP address 315 of the selected video game apparatus 141 or 142 are noticed to the corresponding video game apparatus 100. Accordingly, the video game apparatus 143 that is connected to the currently logged-out video game apparatus 142 to browse the game becomes the video game apparatus 143 that can be connected to the newly selected video game apparatus 141 or 142 to read the game of the designated battle zone.

Figure 6D:
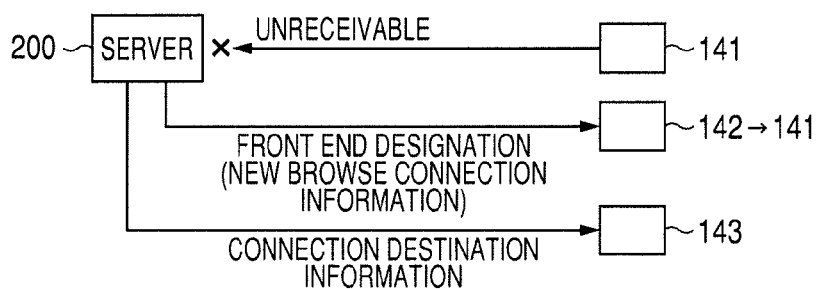
Figure 6E:
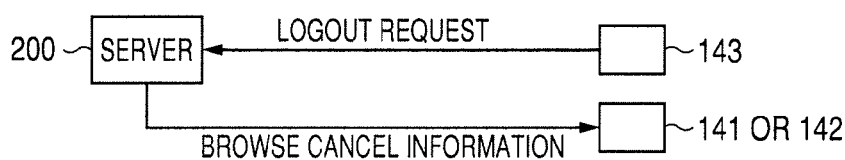

As shown in FIG. 6D, each time information is received from the video game apparatus 141 currently designated as the front end server, the server apparatus 200 updates the date and time 321, at which information is finally received, registered in the game progress table 310 of the video game apparatus group 140. Simultaneously, the server apparatus 200 monitors whether or not new information is received even if a predetermined time elapses from the registered date and time 321.

If new information is not received even if the predetermined time elapses from the registered date and time 321, the server apparatus 200 determines that communication with the video game apparatus 141 is disconnected, and performs a processing to forcibly log out the video game apparatus 141. The server apparatus 200 also deletes a record regarding the video game apparatus 141 from the game progress table 320. Next, one from among other video game apparatuses 142 belonging to the video game apparatus group 140 is selected as a new front end server.

The server apparatus 200 transmits an instruction to designate as the front end server to the video game apparatus 142 with reference to the IP address 315 registered in the connection state table 310 with respect to the selected video game apparatus 142. This instruction includes the ID 311 and the IP address 315 of all other video game apparatuses in the video game apparatus group 140. The video game apparatus 142 that receives the instruction becomes the video game apparatus 141 which is designated as the new front end server.

If there is the video game apparatus 143 with the video game apparatus 141, which requests the logout, set in the browsing destination information 318, the server apparatus 200 selects one of the video game apparatuses 141 and 142 registered in the game progress table 320 with respect to the same video game apparatus group 140. The server apparatus 200 also registers information (ID or the like) for specifying the selected video game apparatus 142 in the browsing destination information 318 of the connection state table 310 with respect to the corresponding video game apparatus 100.

Next, the ID 311 and the IP address 315 of the video game apparatus 143 are noticed to the selected video game apparatus 141 or 142 from the game progress table 320 of the corresponding battle zone, and the ID 311 and the IP address 315 of the selected video game apparatus 141 or 142 are noticed to the corresponding video game apparatus 100. Accordingly, the video game apparatus 143 that is connected to the currently logged out video game apparatus 142 to browse the game becomes the video game apparatus 143 that can be connected to the newly selected video game apparatus 141 or 142 to browse the game of the designated battle zone.

Hereinafter, a predetermined processing that is executed in each of the server apparatus 200 and the video game apparatus 100 forming the network game system of this embodiment will be described. The processing in the video game apparatus 100 is different between the video game apparatuses 141, 142, 151, 152, . . . that are playing the game and the video game apparatuses 143, 153, . . . that just browse the game, and thus both cases will be described separately.

Figure 7:
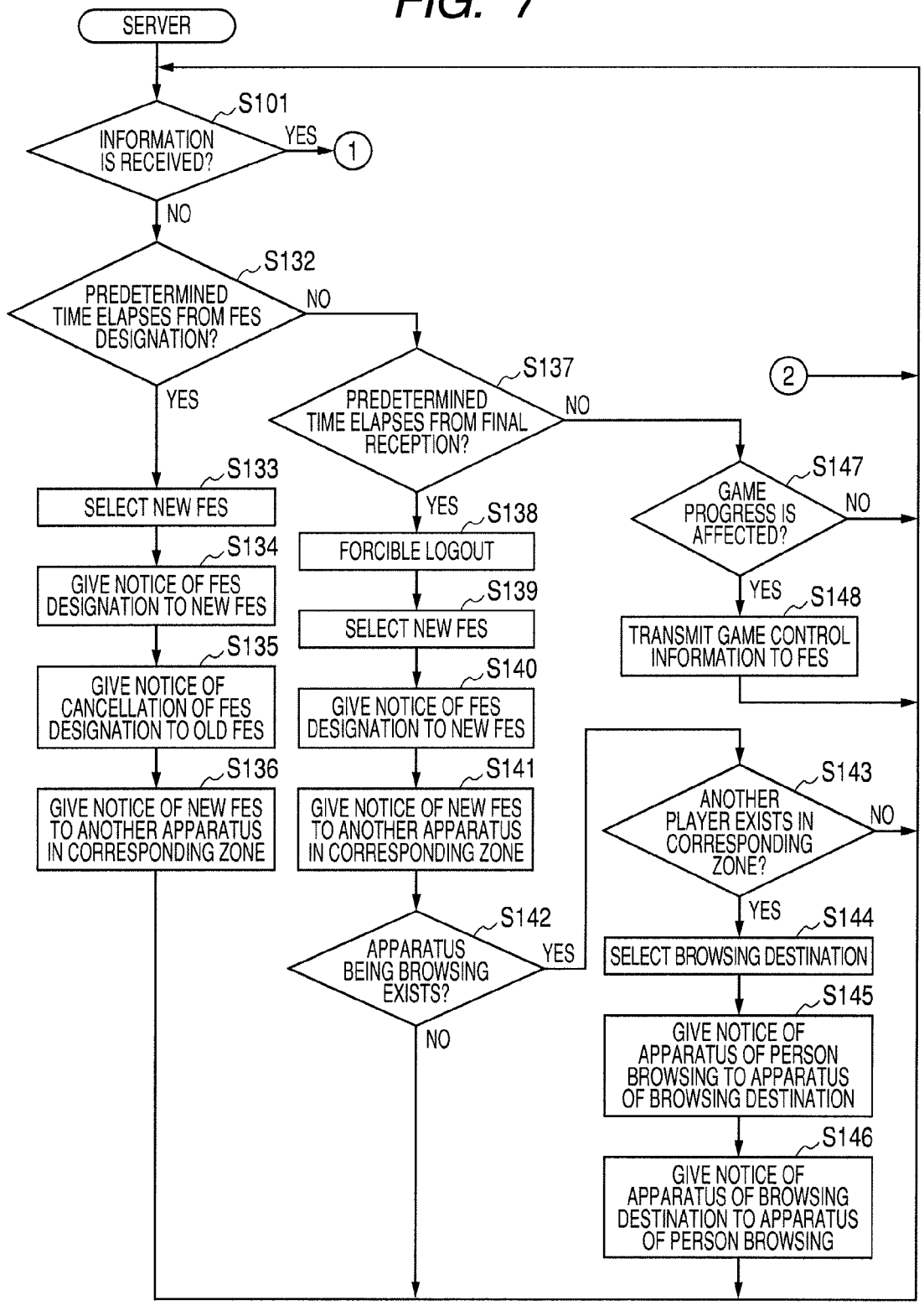
FIG. 7 is a flowchart showing a processing which is executed in a server apparatus of FIGS. 1 and 3.
Figure 8:
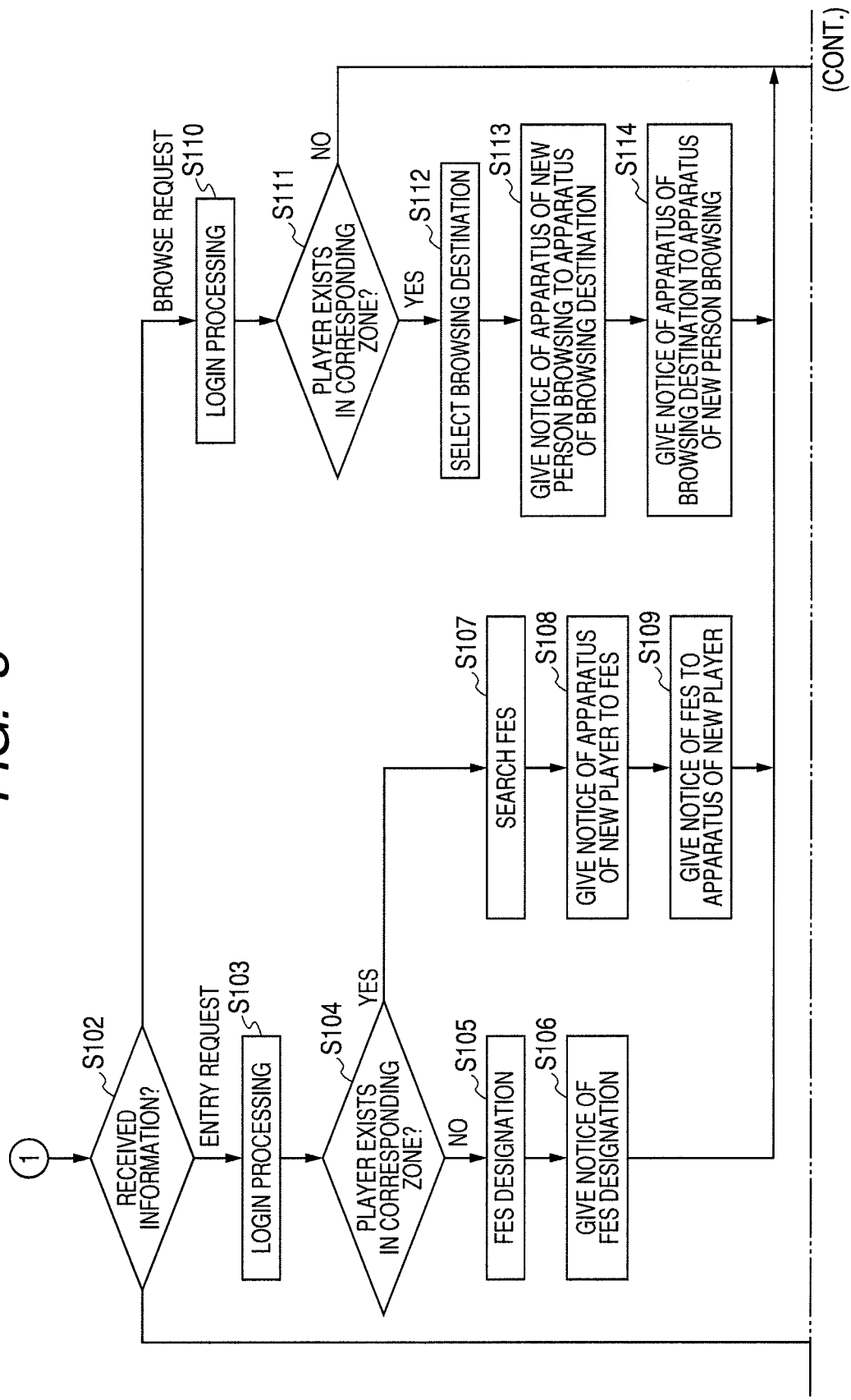
FIG. 8 is a flowchart showing a processing which is executed in a server apparatus of FIGS. 1 and 3.

FIGS. 7 and 8 are flowcharts showing a processing which is executed in the server apparatus 200. The control unit 203 of the server apparatus 200 determines whether or not any information is received from a video game apparatus 100 on the network (Step S101). If any information is received from a video game apparatus 100, the control unit 203 determines what information is received (Step S102).

If the received information is a login request in which "enter" in the enter/browse classification is designated, the control unit 203 compares the ID and the password transmitted together with the login request with the ID 311 and the password 312 registered in the connection state table 310, and performs authentication of the corresponding video game apparatus 100. If authentication is granted, with respect to the video game apparatus 100 representing the ID transmitted together with the login request, the control unit 203 registers current date and time in the login date and time 313 of the connection state table 310, and deletes the logout date and time 314 registered at the time of previous logout. In addition, the control unit 203 registers the IP address 315 of the video game apparatus 100, which requests the login, and the battle zone classification 316, and sets the enter flag 317.

Furthermore, the control unit 203 creates a record of the corresponding video game apparatus 100 in the game progress table 320 corresponding to the battle zone designated in the login request, registers the ID as the ID 322 together with the login request, and registers a team designated in the login request as the team 325 (Step S103).

Next, the control unit 203 determines whether or not information regarding other video game apparatuses 100, which are playing the game in the corresponding battle zone, is registered in the game progress table 320 corresponding to the battle zone designated in the login request (Step S104). If no other video game apparatuses 100 that are playing the game in the corresponding battle zone are registered, the control unit 203 sets the front end flag 323 in the game progress table 320 of the video game apparatus 100, which requests the login, and registers the current date and time in the designated date and time 324 (Step S105). The control unit 203 also transmits, to the corresponding video game apparatus 100, an instruction purporting the designation of the front end server (Step S106). Next, the process returns to Step S101.

If other video game apparatuses 100 that are playing the game in the corresponding battle zone are registered, the control unit 203 searches the video game apparatus 100 with the front end flag 323 set, that is, the video game apparatus currently designated as the front end server in the video game apparatus group in the battle zone, from among the video game apparatuses 100 registered in the game progress table 320 corresponding to the battle zone designated in the login request (Step S107).

The control unit 203 transmits information (including the ID 311 and the IP address 315) for specifying the video game apparatus 100, which newly enters the game in the corresponding battle zone, to the video game apparatus 100 designated as the front end server (Step S108). The control unit 203 also transmits information (including the ID 311 and the IP address 315) for specifying the video game apparatus designated as the front end server to the video game apparatus 100, which newly enters the game in the battle zone (Step S109). Next, the process returns to Step S101.

If the received information is a login request in which "browse" is designated in the enter/browse classification, the control unit 203 compares the ID and the password transmitted together with the login request with the ID 311 and the password registered in the connection state table 310, and performs authentication of the video game apparatus 100. If authentication is granted, with respect to the video game apparatus 100 representing the ID transmitted together with the login request, the control unit 203 registers the current date and time in the login date and time 313 of the connection state table 310, and deletes the logout date and time 314 registered at the time of previous logout. The control unit 203 also registers the IP address 315 of the video game apparatus 100, which requests the login (Step S110).

Next, the control unit 203 determines whether or not information regarding the video game apparatuses 100, which are playing the game in the battle zone, is registered in the game progress table 320 corresponding to the battle zone designated in the login request (Step S111). If no other video game apparatuses 100 that are playing the game in the battle zone are registered, the process returns to Step S101.

When other video game apparatus 100 that are playing the game in the battle zone are registered, the control unit 203 selects one of the video game apparatuses 100 registered in the game progress table 320 corresponding to the battle zone as a browsing destination. Next, the control unit 203 registers information representing the selected video game apparatus 100 in the browsing destination information 318 of the video game apparatus 100 which requests the login, that is, the video game apparatus 100 which wants to newly browse the game (Step S112).

The control unit 203 transmits information (including the ID 311 and the IP address 315) for specifying the video game apparatus 100, which newly browses the game in the battle zone, in the video game apparatus 100 selected as the browsing destination (Step S113). The control unit 203 also transmits information (including the ID 311 and the IP address 315) for specifying the video game apparatus 100 selected as the browsing destination to the video game apparatus 100 that newly browses the game in the battle zone (Step S114). Next, the process returns to Step S101.

If the received request is a logout request, the control unit 203 determines whether or not the video game apparatus 100, which requests the logout, is currently designated as the front end server (that is, the front end flag 323 is set) (Step S115).

If the video game apparatus 100, which requests the logout, is designated as the front end server, the control unit 203 newly selects one video game apparatus 100 from among other video game apparatuses 100 registered in the game progress table 320 of the same battle zone as the video game apparatus 100, which requests the logout, as the front end server. Then, the control unit 203 sets the front end flag 323 of the game progress table 320 with respect to the video game apparatus 100, and registers the current date and time in the designated date and time 324 (Step S116).

Next, the control unit 203 transmits an instruction indicating the designation of the front end server to the video game apparatus 100 newly designated as the front end server, and transmits information (including the ID 311 and the IP address 315) for specifying all the video game apparatuses 100 which are playing the game in the battle zone (Step S117). In addition, the control unit 230 transmits information (including the ID 311 and the IP address 315) for specifying the video game apparatus 100 newly designated as the front end server to all the video game apparatuses 100 which are playing the game in the battle zone (Step S118). Next, the process progresses to Step S121.

When the video game apparatus 100 which requests the logout is not currently designated as the front end server, the control unit 203 determines whether or not the video game apparatus 100 which requests the logout is a video game apparatus 100 that is playing the game but is not designated as the front end server (Step S119). In case of the video game apparatus 100 that is playing the game, the control unit 203 transmits information for specifying the video game apparatus 100, which requests the logout, to the video game apparatus 100 designated as the front end server (Step S120). Next, the process progresses to Step S121.

In Step S121, with respect to the video game apparatus 100 which requests the logout, the control unit 203 registers the current date and time in the logout date and time 314 of the connection state table 310, and performs a processing to log out the video game apparatus 100. The control unit 203 deletes the record of the video game apparatus 100, which requests the logout, from the game progress table 320.

Subsequently, the control unit 203 determines whether or not there are other video game apparatuses 100 with the logged-out video game apparatus 100 registered in the browsing destination information 318 (Step S122). If there are no other video game apparatuses 100 with the logged-out video game apparatus 100 registered in the browsing destination information 318, the process directly returns to Step S101.

If there are other video game apparatuses 100 with the logged-out video game apparatus 100 as the browsing destination information 318, the control unit 203 determines whether or not video game apparatuses 100 are registered in the game progress table 320 in which the logged-out video game apparatus 100 was registered, that is, there are other video game apparatuses 100 that are playing the game in the corresponding battle zone (Step S123). If there are no video game apparatuses 100 that are playing the game in the battle zone, the process returns to Step S101.

If there are other video game apparatuses 100 that are playing the game in the corresponding battle zone, the control unit 203 selects, as the browsing destination, one of the video game apparatuses 100 registered in the game progress table 320 in which the logged-out video game apparatus 100 was registered. The control unit 203 newly registers information representing the selected video game apparatus 100 in the browsing destination information 318 of the video game apparatus 100, which had the logged-out video game apparatus 100 as the browsing destination (Step S124).

The control unit 203 transmits information (including the ID 311 and the IP address 315) for specifying the video game apparatus 100, which has the logged-out video game apparatus 100 as the browsing destination, to the video game apparatus 100 selected as the browsing destination (Step S125). The control unit 203 also transmits information (including the ID 311 and the IP address 315) for specifying the video game apparatus 100 selected as the browsing destination to the video game apparatus 100, which had the logged-out video game apparatus 100 as the browsing destination (Step S126). Next, the process returns to Step S101.

When the video game apparatus 100 that requests the logout is a video game apparatus 100 being just browsing the game, the control unit 203 transmits information for specifying the video game apparatus 100, which requests the logout, that is, stops to browse the game, to the video game apparatus 100 registered in the browsing destination information 318 of the video game apparatus 100, which requests the logout (Step S127). The control unit 203 also registers the current date and time in the logout date and time 314 of the connection state table 310 with respect to the video game apparatus 100, which requests the logout, and performs a processing to log out the video game apparatus 100 (Step S128).

If the received information is game information transmitted from the video game apparatus 100 designed as the front end server, the control unit 203 updates, to the current date and time, the final reception date and time 321 of the game progress table 320 corresponding to the video game apparatus group to which the video game apparatus 100, which transmits the game information, belongs (Step S129). On the basis of the received game information, the control unit 203 also updates the game status 326 of each of the video game apparatuses 100 registered in the game progress table 320 corresponding to the video game apparatus group to which the video game apparatus 100, which transmits the game information, belongs (Step S130). Next, the process returns to Step S101.

If the received information is other kinds of information, the control unit 203 performs a predetermined processing based on the received information (Step S131). This processing has no direct relation to the invention, and thus a detailed description thereof will be omitted.

If it is determined in Step S101 that no information is received from any video game apparatus 100, the control unit 203 determines whether or not a time elapsed from the designated date and time 324 in the game progress table 320 registered with respect to each of the video game apparatuses 100 with the front end flag 323 set for each battle zone till now reaches a predetermined time, that is, there is a video game apparatus 100 with a predetermined time elapsed after being designated as the front end server (Step S132).

If there is a video game apparatus 100 with a predetermined time elapsed after being designated as the front end server, the control unit 103 newly selects a video game apparatus 100 from among other video game apparatuses 100 registered in the game progress table 320 of the same battle zone as the front end server, sets the front end flag 323 of the game progress table 320 with respect to the selected video game apparatus 100, and registers the current date and time in the designated date and time 324 (Step S133).

Next, the control unit 203 transmits an instruction indicating the designation of the front end server to the video game apparatus 100 newly designated as the front end server, and transmits information (including the ID 311 and the IP address 315) for specifying all other video game apparatuses 100 that are playing the game in the corresponding battle zone (Step S134). The control unit 203 also transmits an instruction indicating destination cancellation of the front end server to the video game apparatus 100 which is designated as the front end server till now (Step S135).

The control unit 203 also transmits information (including the ID 311 and the IP address 315) for specifying the video game apparatus 100 newly designated as the front end server to all other video game apparatuses 100 which are playing the game in the corresponding battle zone (Step S136). Next, the process returns to Step S101.

If there is no video game apparatus 100 with a predetermined time elapsed after being designated as the front end server, the control unit 203 determines whether or not a time elapsed from the final reception date and time 321 registered in the game progress table 320 for each battle zone till now reaches a predetermined time, that is, a predetermined time elapses after information is finally received from the video game apparatus 100 designated as the front end server (Step S137).

If the predetermined time elapses after information is finally from the video game apparatus 100 designated as the front end server, the control unit 203 performs a processing to forcibly log out the video game apparatus 100 designated as the front end server till now in the corresponding battle zone. Specifically, the control unit 203 registers the current date and time in the logout date and time 314 in the connection state table 310 with respect to the corresponding video game apparatus 100 (Step S138).

Next, the control unit 203 newly selects a video game apparatus 100 from among other video game apparatuses 100 registered in the game progress table 320 of the corresponding battle zone as the front end server, sets the front end flag 323 of the game progress table 320 with respect to the selected video game apparatus 100, and registers the current date and time in the designated date and time 324 (Step S139).

Next, the control unit 203 transmits an instruction indicating the designation of the front end server and information (including the ID 311 and the IP address 315) for specifying all other video game apparatuses 100, which are playing the game in the corresponding battle zone, to the video game apparatus 100 newly designated as the front end server (Step S140). The control unit 203 also transmits information (including the ID 311 and the IP address 315) for specifying the video game apparatus 100 newly designated as the front end server to all other video game apparatuses 100, which are playing the game in the battle zone (Step S141).

Next, the control unit 203 determines whether or not there are other video game apparatuses 100 with the forcibly logged-out video game apparatus 100 registered in the browsing destination information 318 (Step S142). If there are no other video game apparatuses 100 with the forcibly logged-out video game apparatus 100 registered in the browsing destination information 318, the process returns to Step S101.

If there are other video game apparatuses 100 with the forcibly logged-out video game apparatus 100 registered in the browsing destination information 318, the control unit 203 determines whether or not other video game apparatuses 100 are registered in the same game progress table 320, in which the logged-out video game apparatus 100 was registered, that is, there are other video game apparatuses 100 which are playing the game in the corresponding battle zone (Step S143). If there are no other video game apparatuses 100 which are playing the game in the battle zone, the process returns to Step S101.

If there are other video game apparatuses 100 which are playing the game in the battle zone, the control unit 203 selects one from the video game apparatuses 100 registered in the same game progress table 320, in which the forcibly logged-out video game apparatus 100 was registered, as the browsing destination. Next, the control unit 203 newly registers information representing the selected video game apparatus 100 in the browsing destination information 318 of each of the video game apparatuses 100, which had the forcibly logged out video game apparatus 100 as the browsing destination (Step S144).

The control unit 203 transmits information (including the ID 311 and the IP address 315) for specifying the video game apparatuses 100, which had the forcibly logged-out video game apparatus 100 as the browsing destination, to the video game apparatus 100 selected as the browsing destination (Step S145). The control unit 203 also transmits information (including the ID 311 and the IP address 315) for specifying the video game apparatus 100 selected as the browsing destination to the video game apparatuses 100, which had the forcibly logged-out video game apparatus 100 as the browsing destination (Step S146). Next, the process returns to Step S101.

If the predetermined time does not elapse after information is finally received from the video game apparatus 100 designated as the front end server, the control unit 203 determines whether or not an event affecting the progress of the game in each battle zone occurs (Step S147). An event affecting the progress of the game in each battle zone may occur, for example, when the current date and time measured by the internal timer reaches predetermined date and time, or when the game status 326 updated in Step S130 is in a predetermined state.

If an event affecting the progress of the game in a battle zone occurs, the control unit 203 transmits game control information based on the affect to the video game apparatus 100 designated as the front end server with respect to the battle zone where such an event occurs (Step S148). Next, the process returns to Step S101. If no event affecting the progress of the game in any battle zones occurs, the process returns to Step S101.

Figure 9:
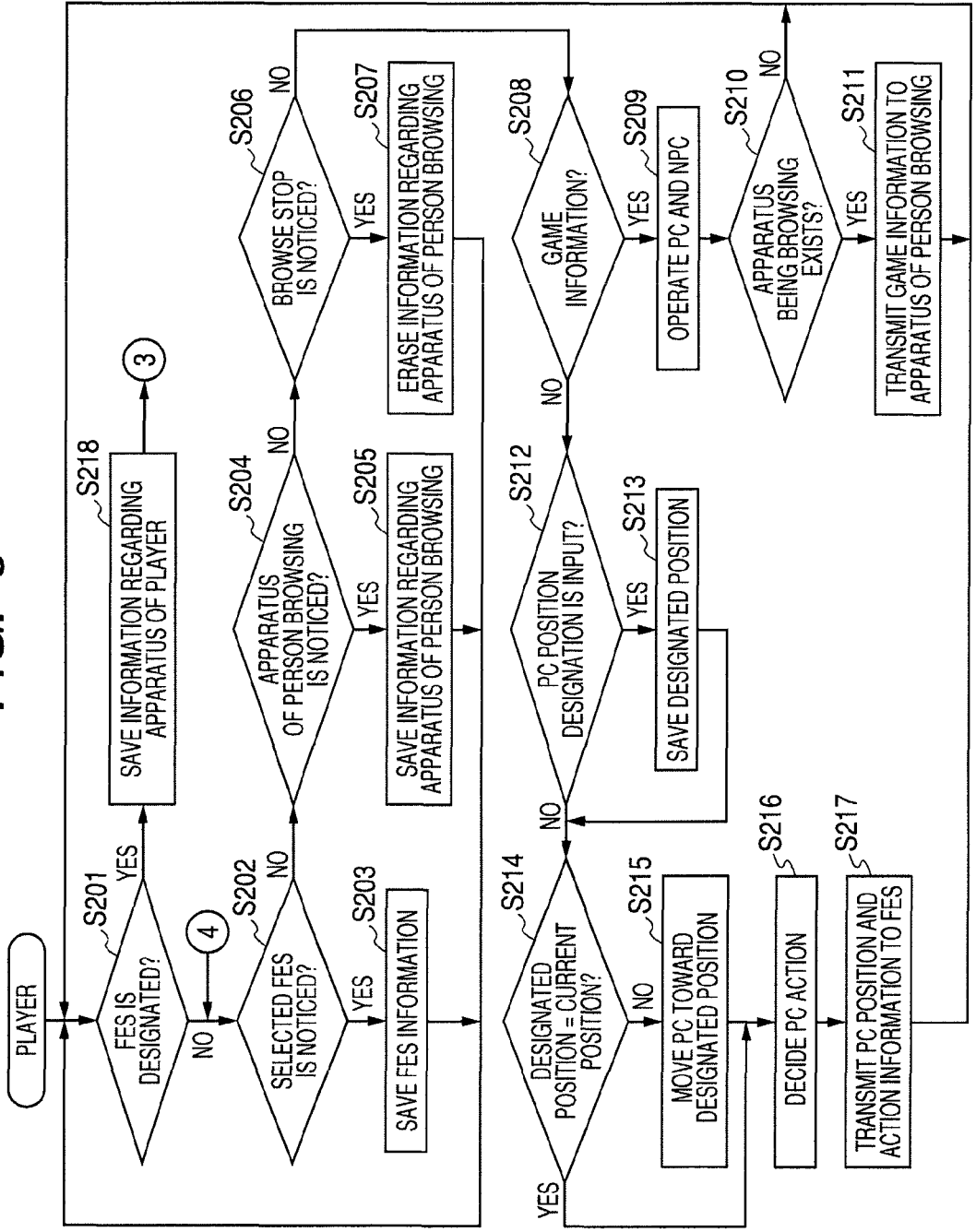
FIG. 9 is a flowchart showing a processing which is executed in a video game apparatus of FIGS. 1 and 2 when a player enters a network game.
Figure 10:
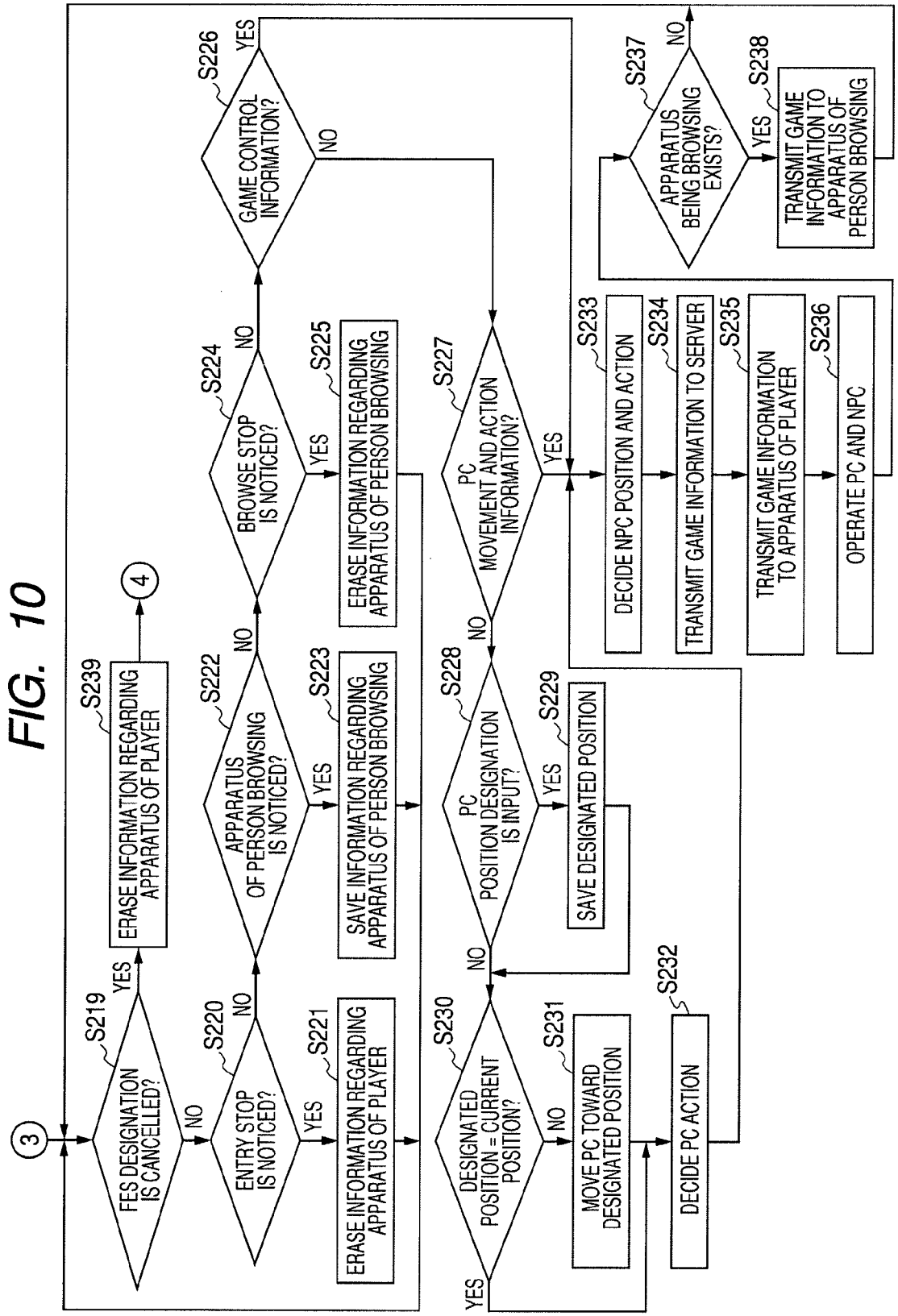
FIG. 10 is a flowchart showing a processing which is executed in a video game apparatus of FIGS. 1 and 2 when a player enters a network game.

FIGS. 9 and 10 are flowcharts showing a processing which is executed in a video game apparatus 100 (141, 142, 151, 152, . . . ) entering the game. In order to enter the game, the video game apparatus 100 logs in to the server apparatus 200 while designating "enter" in the enter/browse classification and designating a battle zone and a team for playing the game. In order to stop to play the game, it is necessary to log out from the server apparatus 200 (including being forcibly logged out), but a processing from login to logout will be described herein.

The control unit 103 of the video game apparatus 100 that enters the game determines whether or not the instruction indicating the designation of the front end server transmitted from server apparatus 200 in Step S106, S117, S134, or S140 is received (Step S201).

If the instruction indicating the designation of the front end server is not received, the control unit 103 determines whether or not information transmitted from the server apparatus 200 in Step S109, S118, S136, or S141 for specifying another video game apparatus 100 designated as the front end server is received (Step S202). If information for specifying another video game apparatus 100 designated as the front end server is received, the control unit 103 stores the information regarding the front end server in the RAM 105 (Step S203). Next, the process returns to Step S201.

If information for specifying another video game apparatus 100 designated as the front end server is not received, the control unit 103 determines whether or not information transmitted from the server apparatus 200 in Step S113, S125, or S145 for specifying the video game apparatus 100 browsing the game is received (Step S204). If information for specifying the video game apparatus 100 browsing the game is received, the control unit 103 stores information regarding the video game apparatus 100 browsing the game in the RAM 105 (Step S205). Next, the process returns to Step S201.

If information for specifying the video game apparatus 100 browsing the game is not received, the control unit 103 determines whether or not information transmitted from the server apparatus 200 in Step S127 for specifying a video game apparatus 100 which stops to browse the game is received (Step S206). If information for specifying the video game apparatus 100 which stops to browse the game is received, the control unit 103 erases information regarding the video game apparatus 100 stored in the RAM 105 as being browsing the game (Step S207). Next, the process returns to Step S201.

If information for specifying the video game apparatus 100 which stops to browse the game is not received, in Step S235 described below, the control unit 103 determines whether or not game information transmitted from another video game apparatus 100 designated as the front end server is received (Step S208). If the game information is received, the control unit 103 moves the player characters and the non-player characters on the basis of the received game information, and displays the player characters and the non-player characters on the display screen 122 (Step S209).

Next, the control unit 103 determines whether or not information regarding a video game apparatus 100 just browsing the game is stored in the RAM 105 (Step S210). If information regarding the video game apparatus 100 just browsing the game is stored, the control unit 103 transmits the game information to another video game apparatus 100 represented by the information (Step S211). Next, the process returns to Step S201. If information regarding the video game apparatus 100 just browsing the game is not stored, the process directly returns to Step S201.

If the game information is not received from the video game apparatus 100 designated as the front end server, the control unit 103 determines whether or not an input to designate the movement position of the player character is accepted from the input unit 161 (Step S212). If the input to designate the movement position of the player character is accepted, the control unit 103 stores the input position in the RAM 105 (Step S213). Next, the process progresses to Step S214. If no input to designate the movement position of the player character is accepted, the process directly progresses to Step S214.

In Step S214, the control unit 103 determines whether or not the position stored in the RAM 105 as the movement position of the player character is identical to the current position the player character on the map. If the stored position and the current position are different, the control unit 103 moves the player character toward the stored position by a predetermined amount (Step S215). Next, the process progresses to Step S216. If the stored position and the current position are identical, or if the movement position of the player character is not stored, the process directly progresses to Step S216.

In Step S216, the control unit 103 decides a battle action its own player character has to take (no action may be taken) on the basis of the current position of its own player character and the positions of other characters (the player characters of other players and the non-player characters) based on the game information received from another video game apparatus 100 designated as the front end server. The control unit 103 transmits information representing the position of the player character on the map and the battle action of the player character to another video game apparatus 100 designated as the front end server (Step S217). Next, the process returns to Step S201.

In Step S201, if the instruction indicating the designation of the front end server is received, the control unit 103 stores, in the RAM 105, information transmitted from the server apparatus 200, together with the instruction, for specifying all other video game apparatuses 100 being playing the game in the corresponding battle zone (Step S218). Next, the control unit 103 determines whether or not an instruction indicating designation cancellation of the front end server transmitted from the server apparatus 200 in Step S135 is received (Step S219).

If the instruction indicating designation cancellation of the front end server is not received, the control unit 103 determines whether or not information transmitted from other video game apparatuses 100 belonging to the video game apparatus group in Step S120 for specifying a video game apparatus 100, which requests the logout (that is, requests stopping to play the game), is received (Step S220). If information for specifying the video game apparatus 100, which requests stopping to play the game, is received, the control unit 103 erases information regarding the video game apparatus 100, which requests stopping to play the game, from the RAM 105 (Step S221). Next, the process returns to Step S219.

If information for specifying the video game apparatus 100, which requests stopping to play the game, is not received, the control unit 103 determines whether or not information transmitted from the server apparatus 200 in Step S113, S125, or S145 for specifying the video game apparatus 100 browsing the game is received (Step S222). If information for specifying the video game apparatus 100 browsing the game is received, the control unit 103 stores information regarding the video game apparatus 100 browsing the game in the RAM 105 (Step S223). Next, the process returns to Step S219.

If information for specifying the video game apparatus 100 browsing the game is not received, the control unit 103 determines whether or not information for specifying a video game apparatus 100 having stopped to browse the game transmitted to the server apparatus 200 in Step S127 is received (Step S224). If information for specifying the video game apparatus 100 having stopped to browse the game is received, the control unit 103 erases information regarding the corresponding video game apparatus 100, which is stored in the RAM 105 as being browsing the game (Step S225). Next, the process returns to Step S219.

If information for specifying the video game apparatus 100 having stopped to browse the game is not received, the control unit 103 determines whether or not the game control information transmitted from the server apparatus 200 in the Step S148 is received (Step S226). If the game control information is received, the process progresses to Step S233.

If the game control information is not received, the control unit 103 determines whether or not information representing the position of the player character of the player on the map and the battle action of the player character transmitted from another video game apparatus 100 belonging to the same video game apparatus group in Step S217 is received (Step S227). If information representing the position of the player character of the player on the map and the battle action of the player character is received, the process progresses to Step S233.

If information representing the position of the player character of the player on the map and the battle action of the player character is not received, the control unit 103 determines whether or not an input to designate the movement position of the player character is accepted from the input unit 161 (Step S228). If the input to designate the movement position of the player character is accepted, the control unit 103 stores the input position in the RAM 105 (Step S229). Next, the process progresses to Step S230. If no input to designate the movement position of the player character is accepted, the process directly progresses to Step S230.

In Step S230, the control unit 103 determines whether or not the position stored in the RAM 105 as the movement position of the player character is identical to the current position of the player character on the map. If the stored position and the current position are different, the control unit 103 moves the player character toward the stored position by a predetermined amount (Step S231). Next, the process progresses to Step S232. If the stored position and the current position are identical, or if the movement position of the player character is not stored, the process directly progresses to the Step S232.

In Step S232, the control unit 103 decides a battle action its own player character has to take (no action may be taken) on the basis of the current position of its own player character and the positions of other characters (the player characters of other players and the non-player characters) based on the game information received from another video game apparatus 100 designated as the front end server. Next, the process progresses to Step S233.

In Step S233, the control unit 103 decides the motions of the non-player character in accordance with the position and the battle action of its own player character decided based on the input from the input unit 161, the positions and the battle actions of the player characters represented by information from the video game apparatuses 100 of other players, and the game control information received from the server apparatus 200.

Next, the control unit 103 transmits the position and the battle action of its own player character decided based on the input from the input unit 161, the positions and the battle actions of the player characters represented by information from the video game apparatuses 100 of other players, and the game information representing the motions decided with respect to the non-player characters to the server apparatus 200 (Step S234). The control unit 103 also transmits the game information to other video game apparatuses 100 belonging to the same video game apparatus group (Step S235).

The control unit 103 moves the player characters and the non-player characters in accordance with the position and the battle action of its own player character decided based on the input from the input unit 161, the positions and the battle actions of the player characters represented by information from the video game apparatuses 100 of other players, and the motions decided with respect to the non-player character, and displays the player characters and the non-player characters on the display screen 122 (Step S236).

Thereafter, the control unit 103 determines whether or not information regarding the video game apparatus 100 just browsing the game is stored in the RAM 105 (Step S237). If information regarding the video game apparatus 100 just browsing the game is stored, the control unit 103 transmits the game information to another video game apparatus 100 represented by the information (Step S238). Next, the process returns to Step S219. If information regarding the video game apparatus 100 just browsing the game is not stored, the process returns to Step S219.

In Step S219, if the instruction indicating designation cancellation of the front end server is received, the control unit 103 erases information for specifying all other video game apparatuses 100 being playing the game in the battle zone stored in the RAM 105 in Step S218 (Step S239). Next, the process progresses to Step S202.

Meanwhile, the video game apparatus 100 (143, 153, . . . ) just browsing the game logs in to the server apparatus 200 while designating "browse" in the enter/browse classification and designating a battle zone for browsing a game. If the video game apparatus 100 just browsing the game logs in to the server apparatus 200, information transmitted from the Step S126 for specifying the video game apparatus 100 (141, 142, 151, 152, . . . ), to which the video game apparatus 100 browsing the game is connected in order to browse the game, is transmitted from the server apparatus 200 and stored in the RAM 205.

If in Step S210, the game information transmitted from the video game apparatus 100, to which the video game apparatus 100 browsing the game is connected in order to browse the game, is received, the video game apparatus 100 just browsing the game moves the player characters and the non-player characters in accordance with the received information and displays the player characters and the non-player characters on the display screen 122. If the video game apparatus 100 stops to browse the game, the video game apparatus 100 may request the server apparatus 200 for the logout.

As described above, in the network game of this embodiment, a plurality of players operate the input units 161 of the individual video game apparatuses 100 to enter the game, and the server apparatus 200 manages the entire progress of the game. Specifically, the server apparatus 200 has the connection state table 310 for managing the connection state of each of the video game apparatuses 100, which can use the service of the network game, and the game progress table 320 for managing the progress state of the game in each of the video game apparatuses 100 being currently playing the game. Therefore, the entire game being played among a plurality of players is managed in a unified manner.

The server apparatus 200 does not directly exchange information with the video game apparatuses 100 being playing the game or does not decide the motions of the non-player characters. The game is played in a battle zone unit, and the server apparatus 200 designates one video game apparatus as the video game apparatus 141, which is the front end server, for each battle zone (for each of the video game apparatus groups 140, 150, . . . ).

From among the processing for the progress of the game in the individual battle zones, decision of the motions of the non-player characters or calculation of the change values of the parameters of the player characters is performed by the video game apparatuses 141, 151, . . . , designated as the front end servers from the video game apparatus groups 140, 150, . . . corresponding to the battle zones. Transmission/reception of information regarding the progress of the game between the video game apparatuses 100 belonging to each of the video game apparatus groups 140, 150, . . . is also controlled by the video game apparatus 141 designated as the front end server. The server apparatus 200 does not need to perform the processing. For this reason, it is possible to implement a network game which is played among the video game apparatuses 100 of the plurality of players, without imposing a lot of load on the server apparatus 200.

The server apparatus 200 needs to collect information regarding the progress state of the game being played among the video game apparatuses 100 in order to manage the progress state of the game among the players. In this embodiment, transmission of such information to the server apparatus 200 is performed only by the video game apparatuses 141, 151, . . . designated as the front end servers from the video game apparatus groups 140, 150, . . . . For this reason, communication traffic can be reduced, and a processing load on the network or the server apparatus 200 can be reduced, as compared with a case where the video game apparatuses 100 individually transmit information regarding the progress state of the game to the server apparatus 200.

The video game apparatuses 141, 151, . . . designated as the front end servers perform decision of the motions of the non-player characters or calculation of the change values of the parameters of the player characters, control transmission/reception of information regarding the progress of the game between the video game apparatuses 100 belonging to each of the video game apparatus groups 140, 150, . . . , and transmit information regarding the progress state of the game to the server apparatus 200. Therefore, the server apparatus 200 can easily designate one from among the video game apparatuses 140 belonging to the video game apparatus groups 140, 150, . . . .

The video game apparatus 141 to be designated as the front end server from among a plurality of video game apparatuses belonging to the video game apparatus groups 140, 150, . . . changes the game for every predetermined time. For this reason, even though an unauthorized person accesses the video game apparatus 141 designated as the front end server at some point, and commits corruption in the game, if another video game apparatus is newly designated as the front end server, such corruption becomes useless. Therefore, corruption by an unauthorized person in the game can be suppressed.

Even though the player of the video game apparatus 141 designated as the front end server leaves the game, and a necessary processing is not executed in the front end server, another video game apparatus is newly designated as the front end server. Therefore, by the video game apparatus 141 newly designated as the front end server, the video game apparatuses 141, 151, . . . designated as the front end servers perform decision of the motions of the non-player character or calculation of the change values of the parameters of the player characters, control transmission/reception of information regarding the progress of the game between the video game apparatuses 100 belonging to each of the video game apparatus groups 140, 150, . . . , and transmit information regarding the progress state of the game to the server apparatus 200.

For this reason, even though the player of the video game apparatus 141 designated as the front end server leaves the game, there is no case where an obstacle occurs in the progress of the game for a long period. In addition, there is no case where the player of the video game apparatus 100 designated as the front end server forcibly continues to enter the game, and thus the player of the video game apparatus 100 can freely enter and leave the game.

The server apparatus 200 manages the date and time 321 at which information is received from each of the video game apparatuses 141, 151, . . . designated as the front end servers (or each of the video game apparatuses 141, 151, . . . is designated as the front end server) for each of the video game apparatus groups 140, 150, . . . . Even though a predetermined period elapses from the date and time 321, if new information is not received, it is determined that communication with each of the video game apparatuses 141, 151, . . . designated as the front end servers is disconnected at present.

In such a case, the server apparatus 200 selects a video game apparatus from among other video game apparatuses 142, 152, . . . belonging to the video game apparatus groups 140, 150, . . . and designates the selected optional video game apparatus as a new front end server. If the new front end server is designated, the video game apparatuses 141, 151, . . .

designated as the front end servers immediately perform processing necessary for the progress of the game. Therefore, a blank period in which no processing for the progress of the game is performed can be shortened, and it is possible to suppress occurrence of an obstacle in the progress of the game for a long period.

In the network game of this embodiment, when a person does not want to actively enter the game in each battle zone, but wants to browse the game being played among other players, the video game apparatuses 143, 153, ... which want to browse the game are appropriately connected to the video game apparatuses 141, 142, 151, 152, ... belonging to the video game apparatus groups 140, 150, ..., and information regarding the progress of the game is transmitted from the video game apparatuses 141, 142, 151, 152, ....

When a person wants to browse the game being played among other players, the server apparatus 200 does not perform a processing to transmit information regarding the progress of the game to the video game apparatuses 143, 153, ... which want to browse the game. Therefore, the processing load of the server apparatus 200 can be reduced. Even though a lot of people want to browse the game in a specific battle zone, the video game apparatuses 141, 142, 151, 152, ... to which the video game apparatuses 143, 153, ... are connected, can be distributed. As a result, there is no case where the processing load on the video game apparatuses 141, 142, 151, 152, ... belonging to the video game apparatus groups 140, 150, ... for browsing of the game excessively increases.

The invention is not limited to the foregoing embodiment, but various changes and applications may be made. Hereinafter, the modifications of the embodiment that are applicable to the invention will be described.

In the foregoing embodiment, the server apparatus 200 changes the video game apparatuses 141, 151, ... designated as the front end servers with respect to the video game apparatus groups 140, 150, ... for every predetermined time. A time interval to change the designation of the front end server may be fixed or changed in view of the processing load on the video game apparatuses 100. For example, the video game apparatuses 141, 151, ... designated as the front end servers may be changed in accordance with the number of the video game apparatuses 141, 142, 151, 152, ... belonging to the video game apparatus groups 140, 150, ....

In the foregoing embodiment, the designation of the front end server by the server apparatus 200 for each of the video game apparatus groups 140, 150, ... is changed when the predetermined time elapses, but the invention is not limited thereto. For example, the designation of the front end server may be changed when an event is generated in the game of the corresponding battle zone (however, it should be expected to be generated at the same time interval as the predetermined time). The new front end server may be sequentially designated in a registration order in the game progress table 320, or may be randomly designated. When a difference in processing capability exists between the video game apparatuses 100 and the server apparatus 200 can recognize the difference, the video game apparatuses 100 may be weighted depending on the difference in processing capability and may be designated as the front end server on the basis of the weighted value.

In the foregoing embodiment, each player character is moved in accordance with the input from the input unit 161 of the corresponding video game apparatus 100, and the battle action is decided by the AI routine which is executed by the corresponding video game apparatus 100. Alternatively, decision of the motions of the player characters in the battle zone may be performed by the video game apparatuses 141, 151, ... designated as the front end servers. In this case, each of the video game apparatuses 142, 152, ... other than the front end server may send information indicating an input from the input unit 161 by the player to a corresponding one of the video game apparatuses 141, 151, ..., and may receive information indicating the motion decided by the corresponding one of the video game apparatuses 141, 151, ....

In the foregoing embodiment, each of the video game apparatuses 141, 151, ... designated as the front end servers performs all processing, such as decision of the motions of the non-player characters, calculation of the change values of the parameters of the player characters, transmission/reception of information regarding the progress of the game between the video game apparatuses 100 belonging to each of the video game apparatus groups 140, 150, ..., and transmission of information regarding the progress state of the game being played in the video game apparatus 100 to the server apparatus 200.

A plurality of kinds of processing may be distributed in and performed by two or more video game apparatuses from among the video game apparatuses 141, 142, 151, 152, ... belonging to the video game apparatus groups 140, 150, .... For example, while a first video game apparatus may perform decision of the motions of the non-player characters and calculation of the change values of the parameters of the player characters, the second video game apparatus may perform transmission/reception of information regarding the progress of the game between the video game apparatuses 100 belonging to each of the video game apparatus groups 140, 150, ..., and transmission of information regarding the progress state of the game being played in each of the video game apparatuses 100 to the server apparatus 200. The server apparatus 200 may individually designate which video apparatus performs which processing.

In the foregoing embodiment, decision of the motions of the non-player character in each battle zone is performed by each of the video game apparatuses 141, 151, ... designated as the front end servers in the video game apparatus groups 140, 150, .... In contrast, two or more of the video game apparatuses 100 belonging to the video game apparatus groups 140, 150, ... may be adapted to decide the motions of the non-player characters in a distributed manner. When the processing is performed by two or more video game apparatuses in a distributed manner, the server apparatus 200 can designate a motion of a non-player character to be decided.

In this case, even though a large number of non-player characters appear in the battle zone, and accordingly a processing lode for decision of the motions of the non-player characters is relatively large, two or more video game apparatuses 100 preferably perform decision of the motions of the non-player character in a distributed manner. Therefore, there is no case where a processing load on each video game apparatus 100 is excessively large.

In the foregoing embodiment, the video game apparatuses 143, 153, ... of the people who want to browse the game being played among other players are connected to the video game apparatus 141, 142, 151, 152, ... belonging to the video game apparatus groups 140, 150, ... corresponding to the battle zones, regardless of whether or not the video game apparatus is designated as the front end server. Meanwhile, the video game apparatuses 141, 151, ... designated as the front end servers have a processing load larger than other video game apparatuses 142, 152, .... Accordingly, if the video game apparatuses 143, 153, ... of people who want to browse the game are connected to the video game apparatuses 141, 151, ..., the processing load of each of the video game apparatuses 141, 151, ... increases.

The video game apparatuses 143, 153, ... of people who want to browse the game being played among other players may be connected to only the video game apparatuses 142, 153, ... not designated as the front end server. When the video game apparatuses 141, 151, ... are newly designated as the front end servers, the server apparatus 200 may connect the video game apparatuses 143, 153, ..., which were connected to the video game apparatuses 141, 151, ..., to other video game apparatuses 142, 152, ....

As such, the video game apparatuses 142, 152, ... not designated as the front end servers from among the video game apparatus belonging to the video game apparatus groups 140, 150, ... have a processing load smaller than the video game apparatuses 141, 151, ... designated as the front end servers. If the video game apparatuses 143, 153, ... are connected to the video game apparatuses 142, 152, ..., a lot of people can be allowed to browse the game.

In the foregoing embodiment, the server apparatus 200 monitors reception of information from the video game apparatus 100 designated as the front end server, and if no information is received for a predetermined period, forcibly logs out the video game apparatus 100. However, with respect to a video game apparatus not designated as a front end server, such an operation is not performed. Accordingly, even if a video game apparatus stops to enter or browse the game, the video game apparatus is not forcibly logged out.

Alternatively, with respect to a video game apparatus 100, which is playing the game, other than the video game apparatus 100 designated as the front end server, the video game apparatus 100 may be adapted to monitor reception of information. If the video game apparatus 100 designated as the front end server finds a video game apparatus 100 from which the position and the battle action of the player character is not received for a predetermined period or more, the video game apparatus 100 serving as the front end server gives notice of the contents to the server apparatus 200, and forcibly logs out the corresponding video game apparatus 100.

With respect to the video game apparatus 100 just browsing the game, the video game apparatus 100 as the browsing destination may regularly request transmission of information and may give notice of a video game apparatus 100, which does not respond a predetermined of times or more, to the server apparatus 200 through the front end server. The server apparatus 200 may forcibly log out the video game apparatus 100, which just browses the game, on the basis of the notice.

In the foregoing embodiment, a case where, if a player who enters the game decides a battle zone when login, the player character of the player plays the game in the same battle zone till logout has been described. Alternatively, the player character may move between the battle zones during the game. For example, when a part of a map of a battle zone is added in the vicinity of the map of another battle zone as a peripheral area, and a player designates the peripheral area as the movement position of the player character, the video game apparatus 100 of the player may be transferred to the video game apparatus group of the battle zone, to which the designated peripheral area originally belongs.

Specifically, it is assumed that a part of a map of a battle zone B is added to a map of a battle zone A as a peripheral area, and a part of the map of the battle zone A is added to the map of the battle zone B as a peripheral area. A player who enters the game in the battle zone A may be adapted to designate a position in the battle zone B (an area added to the map of the battle zone A as a peripheral area) as the movement position of the player character when his/her player character exists in the peripheral area of the map of the battle zone B.

If the video game apparatus 100 is designated as the front end server, information that the position in the battle zone B is designated as the movement position of the player character is directly noticed to the server apparatus 200. If the video game apparatus 100 is not designated as the front end server, information regarding the video game apparatus 100, which designates the position in the battle zone B as the movement position of the player character, is noticed to the server apparatus 200.

If information is noticed, the server apparatus 200 may overwrite the battle zone classification 316 registered in the connection state table 310 with respect to the corresponding video game apparatus 100, and may transmit information regarding the video game apparatus 100, which moves to a new battle zone and enters the game, to the video game apparatus 100 designated as the front end server in the new battle zone. In addition, information regarding the video game apparatus 100 currently designated in the battle zone may be transmitted to the video game apparatus 100, which moves to the new battle zone and enters the game.

If the video game apparatus 100, which moves to the new battle zone and enters the game, is designated as the front end server in the battle zone before movement, another video game apparatus 100 being playing the game in the corresponding battle zone may be selected as a new front end server in the battle zone. To the video game apparatuses 100 that are browsing the game with the video game apparatus 100, which moves to the new battle zone and enters the game, as the browsing destination, another video game apparatus 100 being playing the game in the corresponding battle zone is noticed as a new browsing destination.

With this processing, the player of each video game apparatus 100 can freely move his/her player character in a wide game space and play the game, without being aware of the battle zones.

In the foregoing embodiment, a single server apparatus 200 manages the connection states of all the video game apparatuses 100, which can use the service of the network game, and manages the progress of the game for each battle zone (for each of the video game apparatus groups 140, 150, ... ). Alternatively, a plurality of server apparatuses may form a server apparatus groups, and the above-described processing may be performed by the individual server apparatuses in a distributed manner. The progress of the game may be controlled by a server apparatus for each battle zone (for each of the video game apparatus groups 140, 150, ... ).

In the foregoing embodiment, a simulation game in which a player who enters the game designates a battle zone and a team, and subsequently automatically designates the movement position of the player character to play the game has been described. Alternatively, the invention may be applied to other genres of games, such as a role playing game and the like. In addition, the invention may be applied to a game in which a player character plays a match with a non-player character, instead of a game in which the player characters play a match among the teams.

In the foregoing embodiment, the video game apparatus 100 which is a game machine is applied as an apparatus forming a platform for executing a video game. In contrast, according to the invention, a general-use personal computer may be implemented as a platform insofar as it includes the same components as those in the video game apparatus 100 and has a network connection function. The invention may be applied to a portable game machine (including a cellular phone having an application execution function) in which the display device 121 and the sound output device 125 are incorporated into the same casing as the apparatus main body 101.

As the recording medium 131, instead of a DVD-ROM or a CD-ROM, a semiconductor memory card may be applied. A card slot into which the memory card is inserted may be provided, instead of the DVD/CD-ROM drive 113. In case of a general-use personal computer, the program and data according to the invention may be stored and provided in the HDD 107 beforehand, instead of being stored and provided in the recording medium 131. As the recording medium in which the program and data according to the invention are stored, an arbitrary one may be used depending on the physical and distribution patterns of hardware.

In the foregoing embodiment, the programs and data of the video game apparatus 100 are stored in the recording medium 131 and distributed. In contrast, the program and data may be stored in a fixed disk device of the server apparatus on the network, and distributed to the apparatus main body 101 through the network. In the video game apparatus 100, the communication interface 115 may receive the program and data from the server apparatus, and the received program and data may be stored in the HDD 107 and loaded onto the RAM 105 at the time of execution. The same is applied to the program and data of the server apparatus 200.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

What is claimed is:

1. A network game system, comprising:
   a server apparatus; and
   a client group that has a plurality of client apparatuses, which are connectable through a predetermined network, the predetermined network being connected to the server apparatus,
   wherein the server apparatus includes:
      a client group manager that receives a request from each of the plurality of client apparatuses for joining the client group through the predetermined network, that authenticates each of the plurality of client apparatuses, and that provides authentication information to each of the plurality of client apparatuses for joining the client group through the predetermined network;
      a connection state manager that manages a connection state of each of the plurality of client apparatuses;
      a game progress state manager that manages a progress state of a network game in each of the plurality of client apparatuses;
      an execution client designator that designates a first optional client apparatus from among the plurality of client apparatuses belonging to the client group as an execution client for executing a predetermined processing among processing for a progress of the network game, and gives a first notice of a first designation of the execution client to the first optional client apparatus through the predetermined network;
      a management client designator that designates a second optional client apparatus from among the plurality of client apparatuses belonging to the client group as a management client for exchanging game progress information regarding the progress of the network game in the client group, and gives a second notice of a second designation of the management client to the second optional client apparatus through the predetermined network;
      a game progress information receiver that receives the game progress information in the client group from the management client designated by the management client designator;
      a game progress state updater that, on the basis of the game progress information received by the game progress information receiver, updates the progress state of the network game in each of the plurality of client apparatuses being managed by the game progress state manager; and
      a disconnection determiner that determines whether communication with at least the first optional client apparatus designated as the execution client from among the plurality of client apparatuses belonging to the client group is disconnected,
   wherein each client apparatus of the plurality of client apparatuses includes:
      an input that performs a predetermined input for the progress of the network game in accordance with an operation of a player;
      a predetermined processing executer that, when the client apparatus is the first optional client apparatus designated as the execution client by the execution client designator, executes the predetermined processing;
      a within-client-group transceiver that transmits and receives game input information based on the input with respect to each of the client apparatuses belonging to the client group and game execution information regarding execution of the predetermined processing by the predetermined processing executer to and from other client apparatuses belonging to the client group through the predetermined network; and
      an outside-client-group transmitter that, when the client apparatus is the second optional client apparatus designated as the management client by the management client designator, transmits the game progress information based on the game input information with respect to each of the client apparatuses belonging to the client group and the game execution information to the server apparatus through the predetermined network, and
   wherein the execution client designator changes the first optional client apparatus that is designated as the execution client from among the plurality of client apparatuses belonging to the client group every predetermined period,
   wherein each of the plurality of client apparatuses plays the network game, the server apparatus manages the network game and does not play the network game, and only the management client from the client group transmits information necessary for the progress of the network game to the server, and
   wherein, when the disconnection determiner determines that the communication with the first optional client apparatus designated as the execution client is disconnected, the execution client designator designates another client apparatus belonging to the client group as the execution client.

2. The network game system according to claim 1, wherein the first optional client apparatus designated as the execution client by the execution client designator is the second optional client apparatus designated as the management client by the management client designator are the same client apparatus.

3. The network game system according to claim 1,
wherein the execution client designator designates at least two client apparatuses from among the plurality of client apparatuses belonging to the client group as the execution client.

4. The network game system according to claim 1,
wherein the network game system further includes an outside-group client apparatus that is connectable to a third optional client apparatus belonging to the client group through the predetermined network, but not through the server apparatus,
each of the plurality of client apparatuses includes an outside-client-group transmitter that transmits the game execution information within the client group to an outside-group client apparatus not belonging to the client group,
the outside-group client apparatus includes:
 a game-information-within-client-group receiver that receives the game execution information within the client group from the outside-client-group transmitter; and
 a game progress state output that, on the basis of the game execution information within the client group received by the game-information-within-client-group receiver, outputs information representing the progress of the network game in the client group.

5. A non-transitory computer-readable medium including a program that is executable by a server apparatus, the non-transitory computer-readable medium causing the server apparatus to function as:
 a client group manager that receives a request from each of a plurality of client apparatuses for joining a client group through a predetermined network, that authenticates each of the plurality of client apparatuses, and that provides authentication information to each of the plurality of client apparatuses for joining the client group through the predetermined network;
 a connection state manager that manages a connection state of each of the plurality of client apparatuses;
 a game progress state manager that manages a progress state of a network game in each of the plurality of client apparatuses;
 an execution client designator that designates a first optional client apparatus from among the plurality of client apparatuses belonging to the client group as an execution client for executing a predetermined processing among processing for a progress of the network game, and gives notice of a first designation of the execution client to the first optional client apparatus through the predetermined network;
 a management client designator that designates a second optional client apparatus from among the plurality of client apparatuses belonging to the client group as a management client for exchanging game progress information regarding the progress of the network game in the client group, and gives notice of a second designation of the management client to the second optional client apparatus through the predetermined network;
 a game progress information receiver that receives the game progress information in the client group from the management client designated by the management client designator;
 a game progress state updater that, on the basis of the game progress information received by the game progress information receiver, updates the progress state of the network game in each of the plurality of client apparatuses being managed by the game progress state manager; and
 a disconnection determiner that determines whether communication with at least the first optional client apparatus designated as the execution client from among the plurality of client apparatuses belonging to the client group is disconnected,
wherein the execution client designator changes the first optional client apparatus that is designated as the execution client from among the plurality of client apparatuses belonging to the client group every predetermined period,
wherein the server apparatus is connected to the client group through the predetermined network,
wherein the server apparatus manages the network game and does not play the network game, and receives information necessary for the progress of the network game from the client group from only the management client from among the plurality of client apparatuses belonging to the client group, and
wherein, when the disconnection determiner determines that the communication with the first optional client apparatus designated as the execution client is disconnected, the execution client designator designates another client apparatus belonging to the client group as the execution client.

6. A non-transitory computer-readable medium including a program that is executable by a computer apparatus, the non-transitory computer-readable medium causing the computer apparatus to function as:
 a client group joiner that requests a server apparatus for authentication for joining a client group through a predetermined network, and that receives authentication information from the server apparatus for joining the client group through the predetermined network;
 an input accepter that accepts a predetermined input for a progress of a network game from an input by an operation of a player;
 a predetermined processing executer that, when the computer apparatus is designated by the server apparatus as an execution computer apparatus for executing a predetermined processing from among processing for the progress of the network game, executes the predetermined processing on the basis of a first notice from the server apparatus;
 a within-group transceiver that transmits and receives game input information based on the input accepted by the input accepter and game execution information regarding execution of the predetermined processing by the predetermined processing executer within the client group through the predetermined network; and
 an outside-group transmitter that, when the computer apparatus is designated by the server apparatus as a management computer apparatus for exchanging game progress information regarding the progress of the network game in the client group with the server apparatus, transmits the game input information with respect to the client group and the game execution information to the server apparatus on the basis of a second notice from the server apparatus,
wherein the computer apparatus is connected to the client group through the predetermined network and the predetermined network is connected to the server apparatus, wherein the computer apparatus plays the network game with client apparatuses of the client group through the predetermined network and does not play the network game with the server apparatus, wherein the within-group transceiver does not transmit and receive the game input information to and from the server apparatus, and wherein the outside-group transmitter only exchanges the progress of the network game with the server apparatus when the computer apparatus is designated as the management computer apparatus.

7. The network game system according to claim 1, wherein the predetermined period is variable.

8. The network game system according to claim 1, wherein the management client designator changes the second optional client apparatus that is designated as the management client from among the plurality of client apparatuses belonging to the client group every predetermined period.

9. The network game system according to claim 1, wherein the predetermined processing that is executed by the execution controller includes controlling non-player characters.

10. The non-transitory computer-readable medium according to claim 5, wherein the first optional client apparatus designated as the execution client by the execution client designator is the second optional client apparatus designated as the management client by the management client designator.

11. The non-transitory computer-readable medium according to claim 5, wherein the execution client designator designates at least two client apparatuses from among the plurality of client apparatuses belonging to the client group as the execution client.

12. The non-transitory computer-readable medium according to claim 5, wherein the predetermined period is variable.

13. The non-transitory computer-readable medium according to claim 5, wherein the management client designator changes the second optional client apparatus that is designated as the management client from among the plurality of client apparatuses belonging to the client group every predetermined period.

14. The non-transitory computer-readable medium according to claim 5, wherein the predetermined processing includes controlling non-player characters.

15. The non-transitory computer-readable medium according to claim 6, wherein the computer apparatus is designated as the execution computer apparatus and designated as the management computer apparatus at a same time.

16. The non-transitory computer-readable medium according to claim 6, wherein the non-transitory computer-readable medium further causes the computer apparatus to function as:
an outside-client-group transmitter that transmits the game execution information within the client group to an outside-group client apparatus not belonging to the client group.

17. The non-transitory computer-readable medium according to claim 6, wherein the predetermined processing that is executed by the predetermined processing executer includes controlling non-player characters.

18. The non-transitory computer-readable medium according to claim 6, wherein the computer apparatus functions as the execution client for a predetermined period of time.

* * * * *